United States Patent
Rawlings

(10) Patent No.: US 8,451,332 B2
(45) Date of Patent: May 28, 2013

(54) INTERIOR MIRROR ASSEMBLY WITH ADJUSTABLE MOUNTING ASSEMBLY

(75) Inventor: Donald S. Rawlings, Caledonia, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 47 days.

(21) Appl. No.: 13/258,850

(22) PCT Filed: Mar. 22, 2010

(86) PCT No.: PCT/US2010/028130
§ 371 (c)(1),
(2), (4) Date: Sep. 22, 2011

(87) PCT Pub. No.: WO2010/111173
PCT Pub. Date: Sep. 30, 2010

(65) Prior Publication Data
US 2012/0026616 A1    Feb. 2, 2012

Related U.S. Application Data

(60) Provisional application No. 61/232,201, filed on Aug. 7, 2009, provisional application No. 61/162,420, filed on Mar. 23, 2009.

(51) Int. Cl.
*H04N 7/18*    (2006.01)

(52) U.S. Cl.
USPC .......................................... 348/148; 359/876

(58) Field of Classification Search
USPC ................................... 348/148; 359/872, 876
See application file for complete search history.

(56) References Cited

U.S. PATENT DOCUMENTS

| | | | |
|---|---|---|---|
| 1,521,508 A | 12/1924 | Denoux |
| 1,800,797 A | 4/1931 | Hoople |
| 2,414,223 A | 1/1947 | De Virgilis |
| 2,456,182 A | 12/1948 | Goble |
| 2,763,188 A | 9/1956 | Bertell |
| 2,856,815 A | 10/1958 | Ross |

(Continued)

FOREIGN PATENT DOCUMENTS

GB    1132384    10/1968

OTHER PUBLICATIONS

International Search Report and Written Opinion for corresponding PCT Application No. PCT/US2010/028130.

*Primary Examiner* — Mark Consilvio
(74) *Attorney, Agent, or Firm* — Gardner, Linn, Burkhart & Flory, LLP

(57) ABSTRACT

An interior rearview mirror assembly includes a mirror casing, a reflective element and a mounting assembly for adjustably mounting the mirror assembly at an interior portion of a vehicle. The mounting assembly has a mounting base and a mounting arm adjustably mounted to the mounting base via a base joint. The reflective element is pivotally adjustable relative to the mounting arm via a mirror pivot joint. The base joint allows for adjustment of the mounting arm in generally a single plane and about a generally horizontal pivot axis when the mirror assembly is normally mounted in the vehicle, with the base joint limiting adjustment of the mounting arm about non-generally horizontal pivot axes. The mirror pivot joint allows for pivotal adjustment of a rearward field of view of the reflective element by a driver of the vehicle when the mirror assembly is normally mounted in the vehicle.

18 Claims, 19 Drawing Sheets

U.S. PATENT DOCUMENTS

| | | | |
|---|---|---|---|
| 2,921,808 A | 1/1960 | David | |
| 2,973,980 A | 3/1961 | Vogt et al. | |
| 3,009,712 A | 11/1961 | Williams | |
| 3,022,096 A | 2/1962 | Schwartz | |
| 3,028,794 A * | 4/1962 | Kinkella | 359/866 |
| 3,104,897 A | 9/1963 | Berger | |
| 3,177,020 A | 4/1965 | Dumpis | |
| 3,367,616 A | 2/1968 | Bausch et al. | |
| 3,374,016 A | 3/1968 | Melton et al. | |
| 3,448,553 A | 6/1969 | Herr et al, | |
| 3,498,579 A | 3/1970 | Vicary | |
| 3,530,495 A | 9/1970 | Kindel | |
| 3,601,352 A | 8/1971 | Jensen et al. | |
| 3,622,112 A | 11/1971 | Stroh | |
| 3,635,435 A | 1/1972 | Perison, Sr. | |
| 3,774,996 A | 11/1973 | Donnelly | |
| 3,841,769 A | 10/1974 | Bowerman | |
| 4,254,931 A | 3/1981 | Aikens et al. | |
| 4,382,572 A | 5/1983 | Thompson | |
| 4,435,042 A | 3/1984 | Wood et al. | |
| 4,436,371 A | 3/1984 | Wood et al. | |
| 4,492,488 A | 1/1985 | Warshawsky | |
| 4,614,412 A | 9/1986 | Cohen | |
| 4,632,348 A | 12/1986 | Keesling et al. | |
| 4,646,210 A | 2/1987 | Skogler et al. | |
| 4,822,140 A | 4/1989 | Mittelhauser | |
| 4,826,289 A | 5/1989 | Vandenbrink et al. | |
| 4,882,565 A | 11/1989 | Gallmeyer | |
| 4,934,802 A * | 6/1990 | Fluharty et al. | 359/841 |
| 4,936,533 A | 6/1990 | Adams et al. | |
| 4,948,242 A | 8/1990 | Desmond et al. | |
| 5,100,093 A | 3/1992 | Rawlinson | |
| 5,100,095 A | 3/1992 | Haan et al. | |
| 5,131,154 A | 7/1992 | Schierbeek et al. | |
| 5,210,652 A * | 5/1993 | Perkinson | 359/841 |
| 5,253,109 A | 10/1993 | O'Farrell et al. | |
| 5,308,247 A | 5/1994 | Dyrdek | |
| 5,327,288 A | 7/1994 | Wellington et al. | |
| 5,521,760 A | 5/1996 | DeYoung et al. | |
| 5,550,677 A | 8/1996 | Schofield et al. | |
| 5,555,136 A | 9/1996 | Waldmann et al. | |
| 5,567,360 A | 10/1996 | Varaprasad et al. | |
| 5,572,354 A | 11/1996 | Desmond et al. | |
| 5,576,687 A | 11/1996 | Blank et al. | |
| 5,582,383 A | 12/1996 | Mertens et al. | |
| 5,610,756 A | 3/1997 | Lynam et al. | |
| 5,632,092 A | 5/1997 | Blank et al. | |
| 5,668,663 A | 9/1997 | Varaprasad et al. | |
| 5,669,698 A | 9/1997 | Veldman et al. | |
| 5,670,935 A | 9/1997 | Schofield et al. | |
| 5,671,996 A | 9/1997 | Bos et al. | |
| 5,680,263 A | 10/1997 | Zimmermann et al. | |
| 5,715,093 A | 2/1998 | Schierbeek et al. | |
| 5,724,187 A | 3/1998 | Varaprasad et al. | |
| 5,760,962 A | 6/1998 | Schofield et al. | |
| 5,796,094 A | 8/1998 | Schofield et al. | |
| 5,798,688 A | 8/1998 | Schofield | |
| 5,820,097 A | 10/1998 | Spooner | |
| 5,877,897 A | 3/1999 | Schofield et al. | |
| 5,878,370 A | 3/1999 | Olson | |
| 5,966,255 A * | 10/1999 | Mochizuki et al. | 359/841 |
| 5,971,552 A | 10/1999 | O'Farrell et al. | |
| 5,984,482 A | 11/1999 | Rumsey et al. | |
| 6,124,886 A | 9/2000 | DeLine et al. | |
| 6,154,306 A | 11/2000 | Varaprasad et al. | |
| 6,178,034 B1 | 1/2001 | Allemand et al. | |
| 6,222,460 B1 | 4/2001 | DeLine et al. | |
| 6,227,675 B1 | 5/2001 | Mertens et al. | |
| 6,227,689 B1 | 5/2001 | Miller | |
| 6,229,319 B1 | 5/2001 | Johnson | |
| 6,243,003 B1 | 6/2001 | DeLine et al. | |
| 6,250,148 B1 | 6/2001 | Lynam | |
| 6,278,377 B1 | 8/2001 | DeLine et al. | |
| 6,313,454 B1 | 11/2001 | Bos et al. | |
| 6,315,421 B1 | 11/2001 | Apfelbeck et al. | |
| 6,318,870 B1 | 11/2001 | Spooner et al. | |
| 6,326,613 B1 | 12/2001 | Heslin et al. | |
| 6,329,925 B1 | 12/2001 | Skiver et al. | |
| 6,353,392 B1 | 3/2002 | Schofield et al. | |
| 6,396,397 B1 | 5/2002 | Bos et al. | |
| 6,420,975 B1 | 7/2002 | DeLine et al. | |
| 6,428,172 B1 | 8/2002 | Hutzel et al. | |
| 6,439,755 B1 | 8/2002 | Fant, Jr. et al. | |
| 6,477,464 B2 | 11/2002 | McCarthy et al. | |
| 6,483,438 B2 | 11/2002 | DeLine et al. | |
| 6,498,620 B2 | 12/2002 | Schofield et al. | |
| 6,501,387 B2 | 12/2002 | Skiver et al. | |
| 6,523,964 B2 | 2/2003 | Schofield et al. | |
| 6,540,193 B1 | 4/2003 | DeLine | |
| 6,598,980 B2 | 7/2003 | Marusawa et al. | |
| 6,614,579 B2 * | 9/2003 | Roberts et al. | 359/267 |
| 6,690,268 B2 | 2/2004 | Schofield et al. | |
| 6,738,088 B1 * | 5/2004 | Uskolovsky et al. | 348/148 |
| 6,762,790 B1 * | 7/2004 | Matko et al. | 348/148 |
| 6,795,111 B1 | 9/2004 | Mazzilli | |
| 6,806,452 B2 | 10/2004 | Bos et al. | |
| 6,822,563 B2 | 11/2004 | Bos et al. | |
| 6,824,281 B2 | 11/2004 | Schofield et al. | |
| 6,847,487 B2 | 1/2005 | Burgner | |
| 6,877,709 B2 | 4/2005 | March et al. | |
| 6,946,978 B2 | 9/2005 | Schofield | |
| 7,004,593 B2 | 2/2006 | Weller et al. | |
| 7,004,606 B2 | 2/2006 | Schofield | |
| 7,184,190 B2 | 2/2007 | McCabe et al. | |
| 7,195,381 B2 | 3/2007 | Lynam et al. | |
| 7,242,320 B2 | 7/2007 | Lawlor et al. | |
| 7,249,860 B2 | 7/2007 | Kulas et al. | |
| 7,253,723 B2 | 8/2007 | Lindahl et al. | |
| 7,255,451 B2 | 8/2007 | McCabe et al. | |
| 7,274,501 B2 | 9/2007 | McCabe et al. | |
| 7,289,037 B2 | 10/2007 | Uken et al. | |
| 7,308,341 B2 | 12/2007 | Schofield et al. | |
| 7,338,177 B2 | 3/2008 | Lynam | |
| 7,360,932 B2 | 4/2008 | Uken et al. | |
| 7,380,996 B2 * | 6/2008 | Kouchi et al. | 396/424 |
| 7,420,756 B2 | 9/2008 | Lynam | |
| 7,480,149 B2 | 1/2009 | DeWard et al. | |
| 7,510,287 B2 | 3/2009 | Hook | |
| 7,609,961 B2 * | 10/2009 | Park | 396/429 |
| 7,626,749 B2 | 12/2009 | Baur et al. | |
| 7,720,580 B2 | 5/2010 | Higgins-Luthman | |
| 7,855,755 B2 | 12/2010 | Weller et al. | |
| 7,881,496 B2 | 2/2011 | Camilleri et al. | |
| 7,946,505 B2 | 5/2011 | Lynam et al. | |
| 8,094,002 B2 * | 1/2012 | Schofield et al. | 340/438 |
| 8,223,203 B2 * | 7/2012 | Ohsumi et al. | 348/148 |
| 2003/0210328 A1 * | 11/2003 | Mazzilli | 348/148 |
| 2006/0050018 A1 | 3/2006 | Hutzel et al. | |
| 2006/0061008 A1 | 3/2006 | Karner et al. | |
| 2007/0297075 A1 * | 12/2007 | Schofield et al. | 359/872 |
| 2009/0231430 A1 * | 9/2009 | Buschmann et al. | 348/148 |
| 2009/0295181 A1 | 12/2009 | Lawlor et al. | |
| 2009/0309971 A1 * | 12/2009 | Schuetz | 348/148 |
| 2010/0085653 A1 | 4/2010 | Uken et al. | |
| 2010/0091394 A1 | 4/2010 | DeWind et al. | |
| 2010/0097469 A1 | 4/2010 | Blank et al. | |
| 2012/0113258 A1 * | 5/2012 | Fiess et al. | 348/148 |

\* cited by examiner

INTERIOR MIRROR ASSEMBLY WITH ADJUSTABLE MOUNTING ASSEMBLY

CROSS REFERENCE TO RELATED APPLICATIONS

The present application claims benefit of U.S. provisional applications, Ser. No. 61/232,201, filed Aug. 7, 2009, and Ser. No. 61/162,420, filed Mar., 23, 2009, which are hereby incorporated herein by reference in their entireties.

FIELD OF THE INVENTION

The present invention relates generally to the field of rearview mirror assemblies for vehicles and, more particularly, to an interior rearview mirror assembly that is adjustably mounted to an interior portion of a vehicle.

BACKGROUND OF THE INVENTION

It is known to provide a mirror assembly that is adjustably mounted to an interior portion of a vehicle, such as via a double ball pivot joint or double ball pivot mounting configuration where the mirror casing and reflective element are adjusted relative to the interior portion of a vehicle by pivotal movement about the double ball pivot arm or configuration. The mirror casing and reflective element are pivotable about either ball pivot joint or ball joint by a user that is adjusting a rearward field of view of the reflective element. In some applications, a mirror assembly may be adjustably mounted to an interior portion of a vehicle via a single ball pivot joint or single pivot mounting configuration.

SUMMARY OF THE INVENTION

The present invention provides an interior rearview mirror assembly adjustably mounted to an interior portion of a vehicle via a single ball pivot joint mounting configuration that allows a user (such as the driver of the vehicle equipped with the mirror assembly) to adjust a rearward field of view of the reflective element via pivotal adjustment of the mirror casing and reflective element about a pivot joint or ball pivot joint. The mirror mounting configuration includes a second adjustable joint or mount or connection that is at least initially adjusted (such as by the manufacturer of the interior mirror assembly itself) to set or establish a selected or preset height or position of the mirror casing and reflective element relative to the interior portion of the vehicle (when the mirror assembly is normally mounted in the vehicle), whereby adjustment about the second or base joint is limited after the mirror height is selected and set, such as by the mirror manufacturer or vehicle manufacturer. The base joint may allow for adjustment of the mirror arm along a generally vertical plane and/or about a generally horizontal pivot axis, while limiting adjustment of the mirror arm about non-generally vertical planes and non-generally horizontal pivot axes, and sets or establishes or presets the desired or appropriate orientation or position of the mounting arm for the particular application of the mirror assembly.

According to an aspect of the present invention, an interior rearview mirror assembly for a vehicle comprises a casing, a reflective element, such as positioned at a bezel portion of the casing, and a mounting configuration for adjustably mounting the mirror assembly at an interior portion of a vehicle. The mounting configuration comprises a mounting base that is attachable to an interior portion of a vehicle and a mounting arm adjustably mounted to the mounting base via a first joint or base joint, with the reflective element adjustably mounted to the mounting arm via a second joint or mirror joint. The mounting arm is adjustable (such as in a single plane or generally vertical plane and/or about a generally horizontal pivot axis) about the base joint to a desired location and may be substantially retained at the desired or preset location so that further adjustment of the mounting arm relative to the mounting base is limited or substantially precluded. The reflective element is adjustable about the mirror joint to adjust a rearward field of view of a driver of a vehicle when the mirror assembly is normally mounted in the vehicle.

Optionally, the base joint may allow for vertical adjustment of the reflective element relative to the mounting base and may limit horizontal adjustment of the reflective element relative to the mounting base when the mirror assembly is normally mounted in the equipped vehicle. The mirror joint may comprise a ball and socket joint and allows for pivotal adjustment of the reflective element relative to the mounting arm in both vertical and horizontal directions (such as providing for about 360 degree adjustment of the mirror casing and/or reflective element by the driver of the vehicle equipped with the mirror assembly).

Optionally, the mounting configuration may include or support a forward facing sensor, such as an imaging sensor or camera or radar sensor or lidar sensor or the like, that has a forward field of view through the windshield of the vehicle (and preferably disposed at a portion of the windshield that is swept by the windshield wipers, be they conventional windshield wipers or butterfly pattern windshield wipers as known in the art) when the mirror assembly and mounting configuration are normally mounted in the equipped vehicle. The forward facing sensor may be set to a predetermined or desired or appropriate angle relative to the mounting arm of the mounting configuration such that the sensor is oriented generally horizontally (or at a desired or appropriate upward or downward angle relative to horizontal) when the mounting arm is set to the desired or appropriate location or orientation for the particular angle of the windshield to which the mirror assembly and mounting configuration are attached. Thus, the sensor's field of view may be preset in the interior mirror/accessory module assembly itself to the desired or appropriate angle or direction when the mounting arm is set to the desired or appropriate windshield angle for the particular vehicle in which the mirror assembly is destined/intended to be mounted.

Thus, in accordance with the present invention, the interior mirror manufacturer, knowing that the mirror assembly being manufactured is intended for use by a known OEM automaker for a given vehicle with a known windshield angle, can standardize the manufacture of mirror assemblies incorporating such forward facing sensors for a broad range of automakers and/or vehicle models and/or windshield angles, and at the likes of an end-of-line assembly step or the like, the particular angle of the mounting arm and/or sensor field of view can be selected and set for the particular windshield angle of the targeted vehicle at which the mirror assembly will be installed. To take an illustrative example, the likes of a Honda Civic may, for example, have a windshield angle of about twenty degrees, while the likes of a Ford Fusion may, for example, have a windshield angle of about thirty degrees, and the mirror manufacturer can at its assembly plant make a common mirror mounting assembly suitable for a wide range of vehicles and windshield angles, and the mirror manufacturer, such as during manufacture and assembly of the mirror, dial in or select or set the desired or appropriate mounting angle for the windshield of the particular or targeted vehicle at which the mirror assembly will be mounted. Thus, in the example, above, an operator on the mirror manufacturer assembly line would set the particular angle to the twenty degree windshield angle setting for mirror assemblies destined to be shipped to the Honda Civic assembly plant and would set the particular angle to the thirty degree windshield angle setting for mirror assemblies destined to be shipped to the Ford Fusion assembly plant.

Once the angle is set or the preset is established, the mounting arm remains at that selected orientation relative to the mounting base during normal use and operation of the mirror assembly in the vehicle. Adjustment of the mirror head (such as to adjust the rearward field of view to the driver of the vehicle) may be accomplished via pivotal movement of the mirror head about the mirror pivot joint, while the preset joint remains unadjusted and the mounting arm remains in its preset condition or orientation relative to the mounting base and vehicle windshield. Although described as having the preset angle set and generally fixed or retained or non-adjusted, it is envisioned that the preset angle may be adjusted (either before the mirror assembly is mounted in a vehicle or after the mirror assembly is mounted in a vehicle), such as via a technician or serviceman or the like, or even via application of additional force or torque at the mounting arm via the user or driver (with the additional force to adjust the mounting arm at the base joint being substantially greater than a force or torque exerted at the mirror head to adjust the mirror head and rearward field of view relative to the mirror pivot or ball joint of the mirror assembly).

Optionally, the adjustable mounting assembly may be provided (without presetting and with a still adjustable state or form) to the vehicle assembly plant and an operator at the vehicle assembly plant may set the angle of the mounting assembly to a particular or preselected angle that is selected for or corresponds to the windshield angle of the windshield at which the mounting assembly and mirror assembly are being mounted. Such a process allows for a single mounting assembly to be provided at a vehicle assembly plant (thus reducing part numbers at the vehicle assembly plant), whereby the mounting assembly may be adjusted and set or preset for application to different vehicles (and different windshield angles) produced or assembled in the vehicle assembly plant.

Advantageously, and in accordance with the present invention, the owner/driver of a vehicle equipped with the mirror assembly of the present invention can, if desired, change the factory set pivot angle, but only with due effort and intent (i.e., with extra effort, but not extraordinary effort). During normal use and normal adjustment of the housing of the mirror assembly about the second pivot joint or ball pivot joint (such as to normally adjust the driver's rearward field of view), adjustment about the first or pre-set pivot joint does not occur. Thus, the present invention provides at least a part of the adjustability provided by a double ball pivot joint mirror assembly (in that the height of the mirror assembly may be set to a desired level by pivoting the mounting arm relative to a first pivot joint that is closer to the mounting base and windshield), while preserving much of the advantages of a single ball mounting assembly (in that the driver's adjustment of the rearward field of view is readily accomplished by pivotal movement of the mirror head and reflective element about the second pivot joint that is at the connection of the mirror head and casing and reflective element to the mirror mounting arm).

These and other objects, advantages, purposes and features of the present invention will become apparent upon review of the following specification in conjunction with the drawings.

DESCRIPTION OF THE PREFERRED EMBODIMENTS

Figure 1:
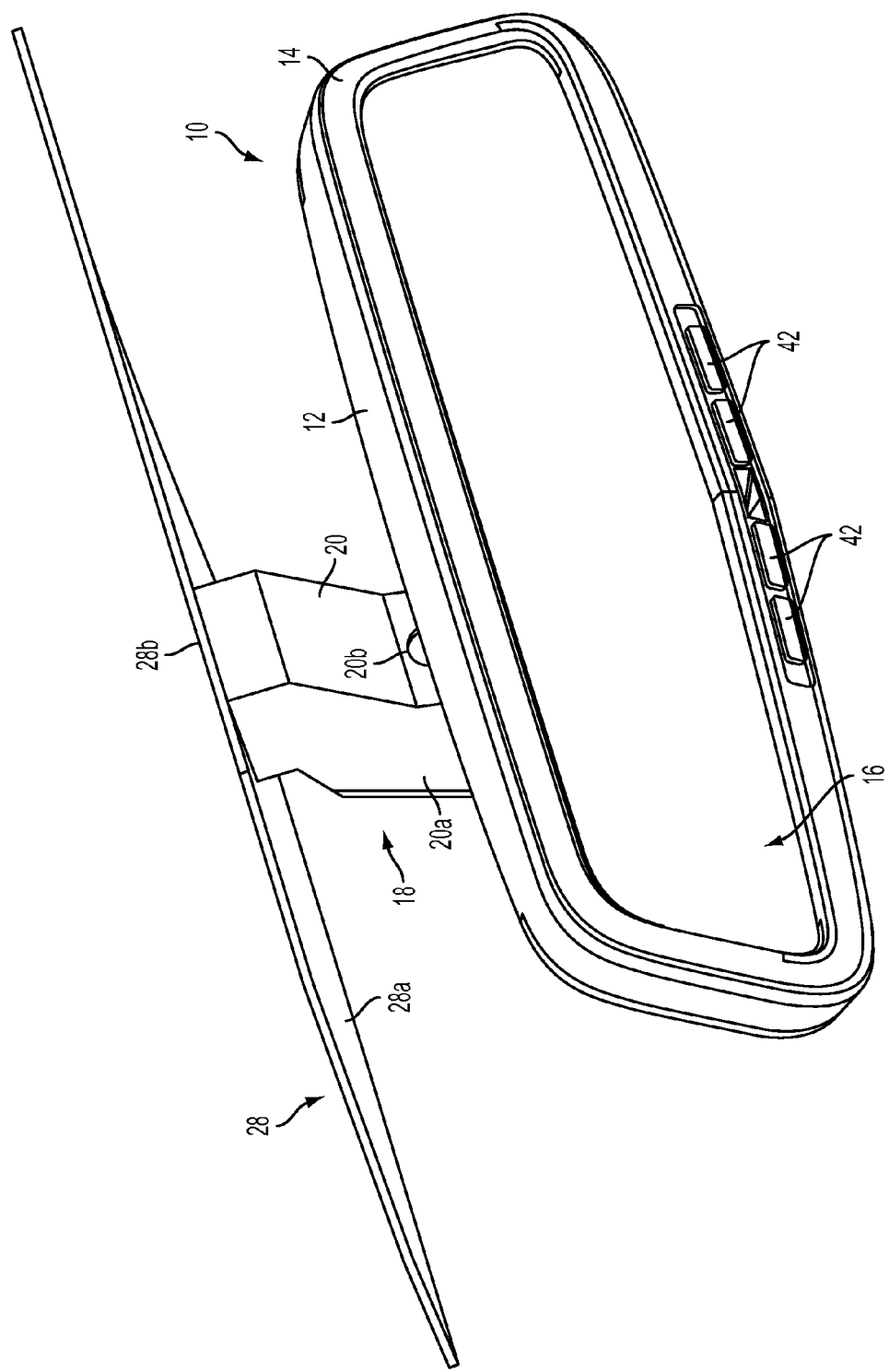
FIG. 1 is a perspective view of an interior rearview mirror assembly and mounting structure in accordance with the present invention.
Figure 2:
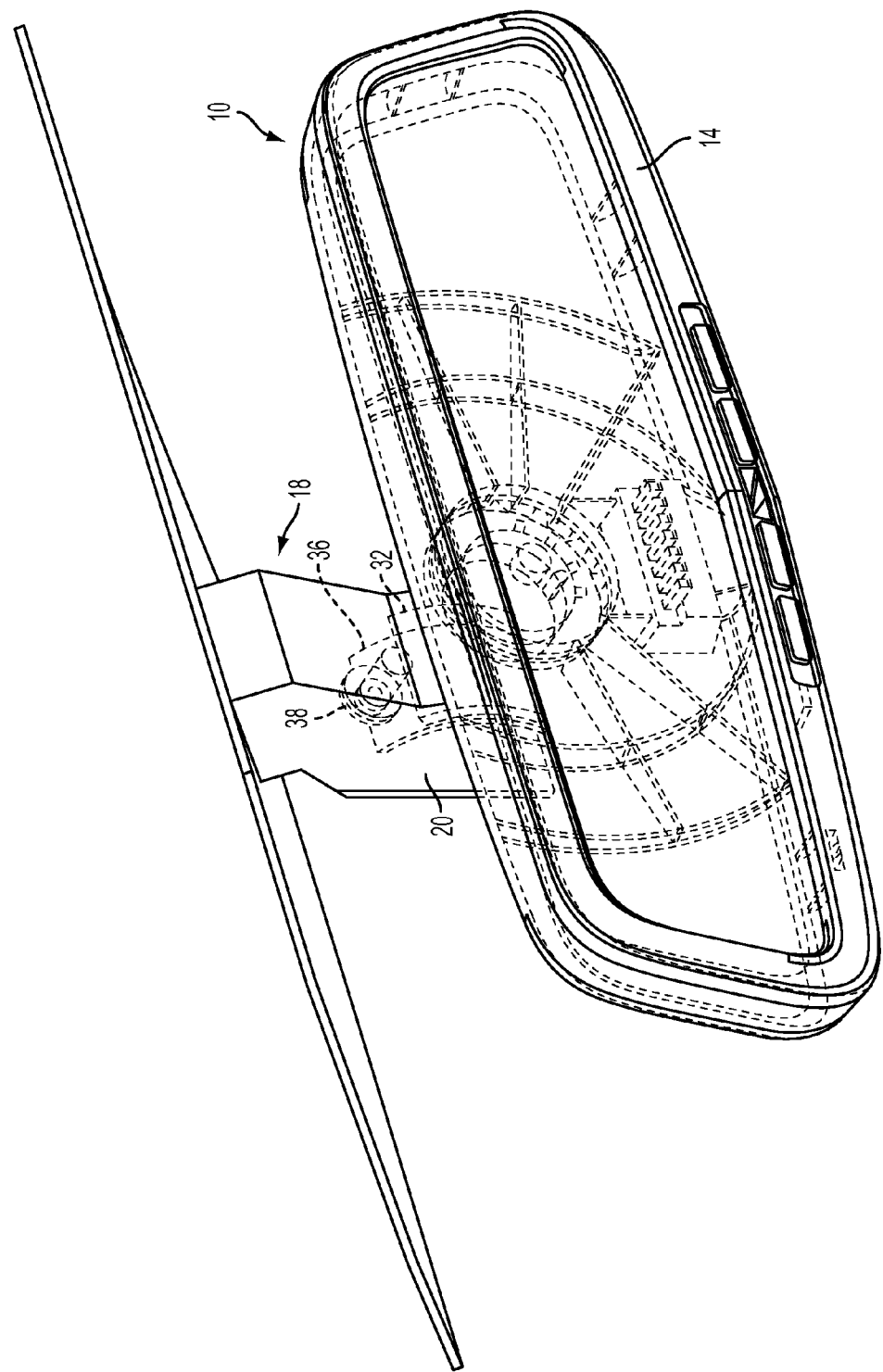
FIG. 2 is a perspective view and partial sectional view of the interior rearview mirror assembly and mounting structure of FIG. 1.
Figure 3:
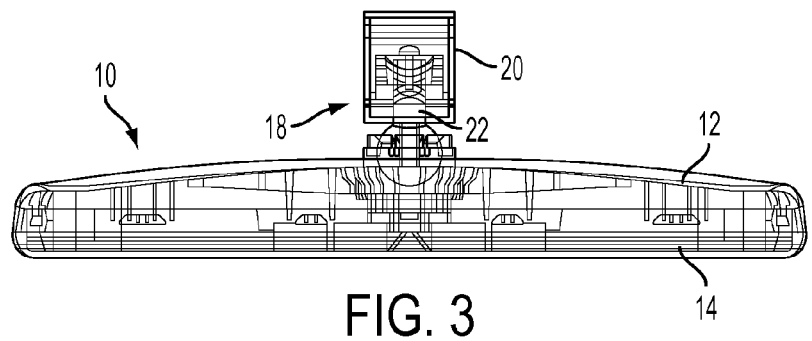
FIG. 3 is an upper plan view of the interior rearview mirror assembly and mounting structure of FIG. 1.
Figure 4:
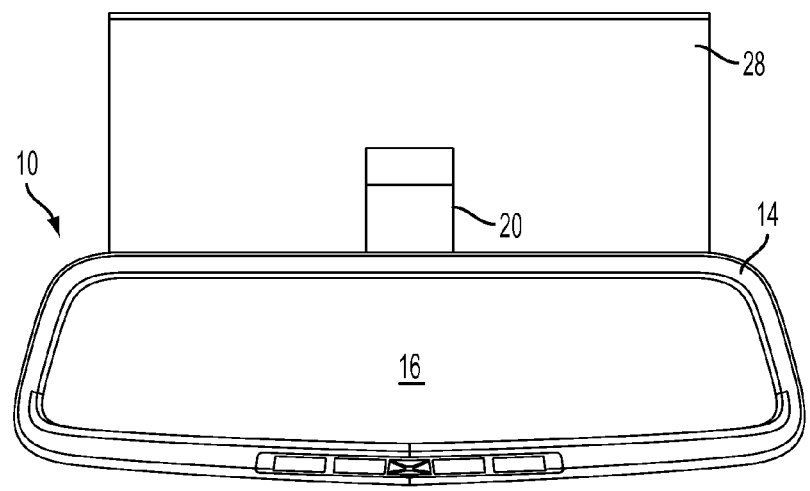
FIG. 4 is a front plan view of the interior rearview mirror assembly and mounting structure of FIG. 1.
Figure 5:
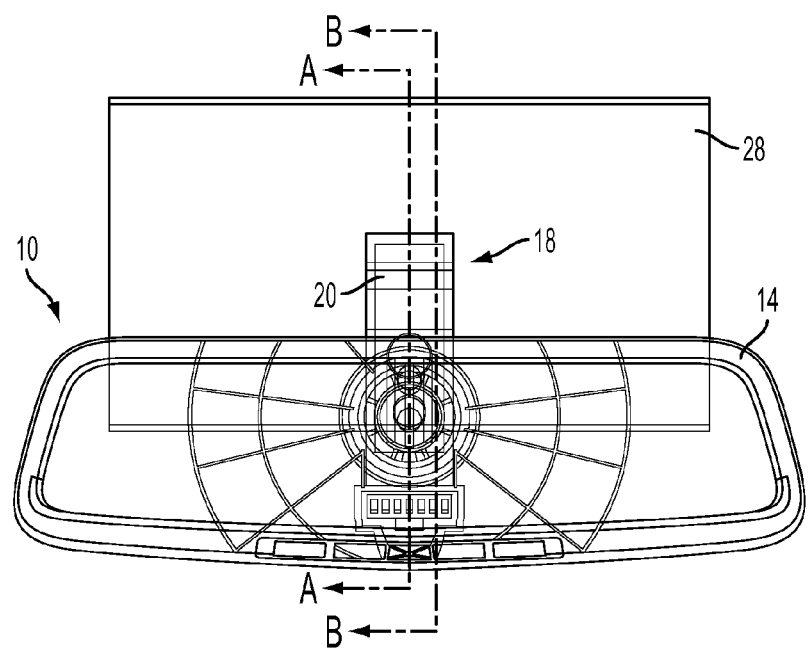
FIG. 5 is a front plan view and partial sectional view of the interior rearview mirror assembly and mounting structure of FIG. 1.

Referring now to the drawings and the illustrative embodiments depicted therein, an interior rearview mirror assembly 10 for a vehicle includes a casing 12, a bezel portion 14 and a reflective element 16 positioned at and at least partially within the casing and/or bezel portion (FIG. 1). Mirror assembly 10 is adjustably mounted to an interior portion of a vehicle (such as to an interior surface of a vehicle windshield or a headliner of a vehicle or the like) via a single ball pivot mounting configuration or assembly 18. Mounting assembly 18 includes a base portion or mounting base or breakaway stay 20 and a mounting arm 22, with the reflective element 16 and mirror casing 12 pivotally mounted at an outer or rearward or mirror or ball end 22a of mounting arm 22 about a first or mirror ball pivot joint 24 (such as a ball and socket joint or the like that allows for a driver of the vehicle to which mirror assembly 10 is mounted to adjust the reflective element vertically and horizontally to adjust the rearward field of view of the driver). The opposite or forward or base end 22b of mounting arm 22 is adjustably mounted to mounting base 20 about a second or adjustable or base joint 26, which allows for vertical adjustment of the reflective element 16 with limited or no side-to-side or lateral adjustment of the reflective element 16 at base joint 26, and whereby the mounting arm 22 may be secured or retained relative to the mounting base at base joint 26 to limit adjustment of the mounting arm relative to the mounting base when the mirror casing and reflective element are set at a desired or appropriate orientation relative to the mounting base to locate the mirror casing and reflective element at a desired or appropriate height when the mirror assembly is normally mounted in the vehicle, as discussed below.

Typically, in order to provide flexibility in the applications of a mirror assembly design or construction, a double ball mounting configuration may be implemented to allow for enhanced adjustment of the vertical location of the mirror head (the mirror casing and reflective element) when the mirror assembly is normally mounted in a vehicle. In applications where a windshield electronics module or accessory module is mounted at the vehicle windshield (such as at a location below the mounting location of the mirror assembly), the mounting base of the mirror assembly may comprise a downward extending base with a single ball pivot joint mounting configuration for adjusting the mirror reflective element about a single ball joint. Such a single ball mounting configuration or adjustment configuration may provide for adjustment of the reflective element at the vertical height or location of the mirror head established by the mounting base, but may not provide for any vertical adjustment of the mirror head to allow for flexibility in the application of the mirror assembly on different vehicles. Typically, in order to provide for such flexibility, either different mounting bases may be provided or tooled, or a double ball pivot joint mounting configuration may be utilized, but such a double ball pivot joint mount may add to the cost of the mounting configuration.

Thus, the present invention provides a limited adjustment joint that may provide for adjustment of the reflective element and mirror casing relative to the mounting base in the vertical direction to provide for flexibility in the application of the mirror assembly, while providing a single ball pivot joint for the field of view adjustment of the mirror reflective element about an adjustable ball and socket type joint at the mirror head. Thus, the mounting configurations may provide multiple head positions or heights with a lower cost single ball pivot joint mounting design. The adjustment of the mounting arm at the mounting base (and at the base joint) may be limited to movement generally in one plane (such as a generally vertical plane when the mirror assembly is normally mounted in a vehicle) and the mounting arm may be locked or secured or retained or preset at or relative to the mounting base via a clamp spring or set screw or the like or any other suitable clamping or locking or retaining means. The repositionable base joint may be set either at the assembly facility (where the mirror assembly is assembled) or by the customer or vehicle manufacturer at the vehicle assembly facility or plant (where the mirror assembly is installed in the vehicle), such as for applications where the vehicle manufacturer wants to purchase a single part (and thus have a single part number in the assembly plant) for two or more applications (such as different vehicles or vehicle platforms).

Although the base joint may be adjustable and may be readjusted after it is initially set, it would be intended for very few adjustments throughout the life of the mirror assembly and vehicle. The normal adjustment of the mirror by the driver of the vehicle (to adjust the rearward field of view of the reflective element) would involve only the single ball pivot joint or ball and socket joint at the mirror head, while the base joint or cylindrical pivot or single plane pivot joint at the mounting base would require a relatively high or very high torque to adjust or would be substantially fixed or not readily adjustable in order to maintain structural integrity at that joint. The advantages of the mounting configuration or system of the present invention include reduced cost, image stability and lower overall investment by the customer if any. The mounting configuration may maintain a breakaway feature while still accommodating multiple windshield angles and restricted mounting space.

In the illustrated embodiment, mounting base 20 is attached to an interior surface 28a of a vehicle windshield 28 (such as to a mounting button or attachment element adhered to the interior surface 28a of the vehicle windshield 28) and extends downwardly from the attachment location 28b. The mounting base may be mounted to a mounting button or attachment element at the vehicle windshield via a breakaway mounting construction, such as by utilizing aspects of the mounting constructions described in U.S. Pat. Nos. 5,820,097 and/or 5,100,095, which are hereby incorporated herein by reference in their entireties. The lower region 20a of mounting base 20 includes a slot or aperture 20b established at a rearward portion lower region 20a (the portion of the mounting base that faces rearward with respect to the direction of travel of the vehicle in which the mirror assembly is mounted) that allows for generally vertical adjustment of mounting arm 18 relative to mounting base 20, as discussed below.

As shown in FIGS. 6-9, mirror joint 24 comprises a ball pivot joint or ball and socket type joint that allows for 360 degree adjustment of the reflective element relative to mounting arm 22. In the illustrated embodiment, mirror end 22a of mounting arm 22 comprises a generally spherical or partially spherical ball member that is received in a socket 30 established at the mirror casing 12 and/or at the rear of the reflective element 16. Mounting arm 22 may comprise a molded (such as injection molded) polymeric mounting arm or may be otherwise formed, depending on the particular application of the mirror assembly (and may utilize aspects of the mounting assemblies described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860; and/or 6,483,438, and/or U.S. patent application Ser. No. 11/226,628, filed Sep. 14, 2005 and published Mar. 23, 2006 as U.S. Publication No. 2006/0061008, which are hereby incorporated herein by reference in their entireties).

Figure 6:
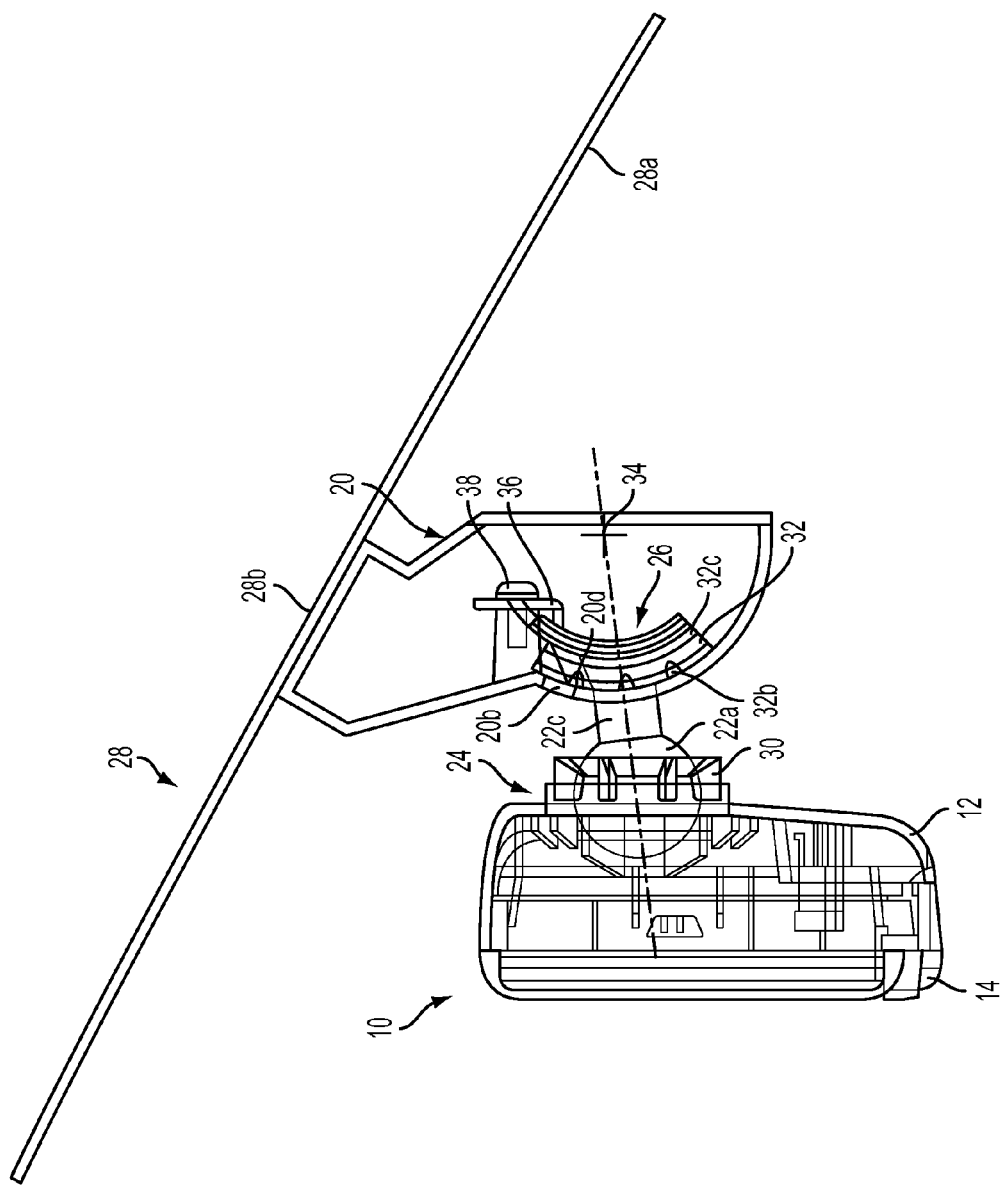
FIG. 6 is a side elevation and partial sectional view of the interior rearview mirror assembly and mounting structure of FIG. 1.
Figure 7:
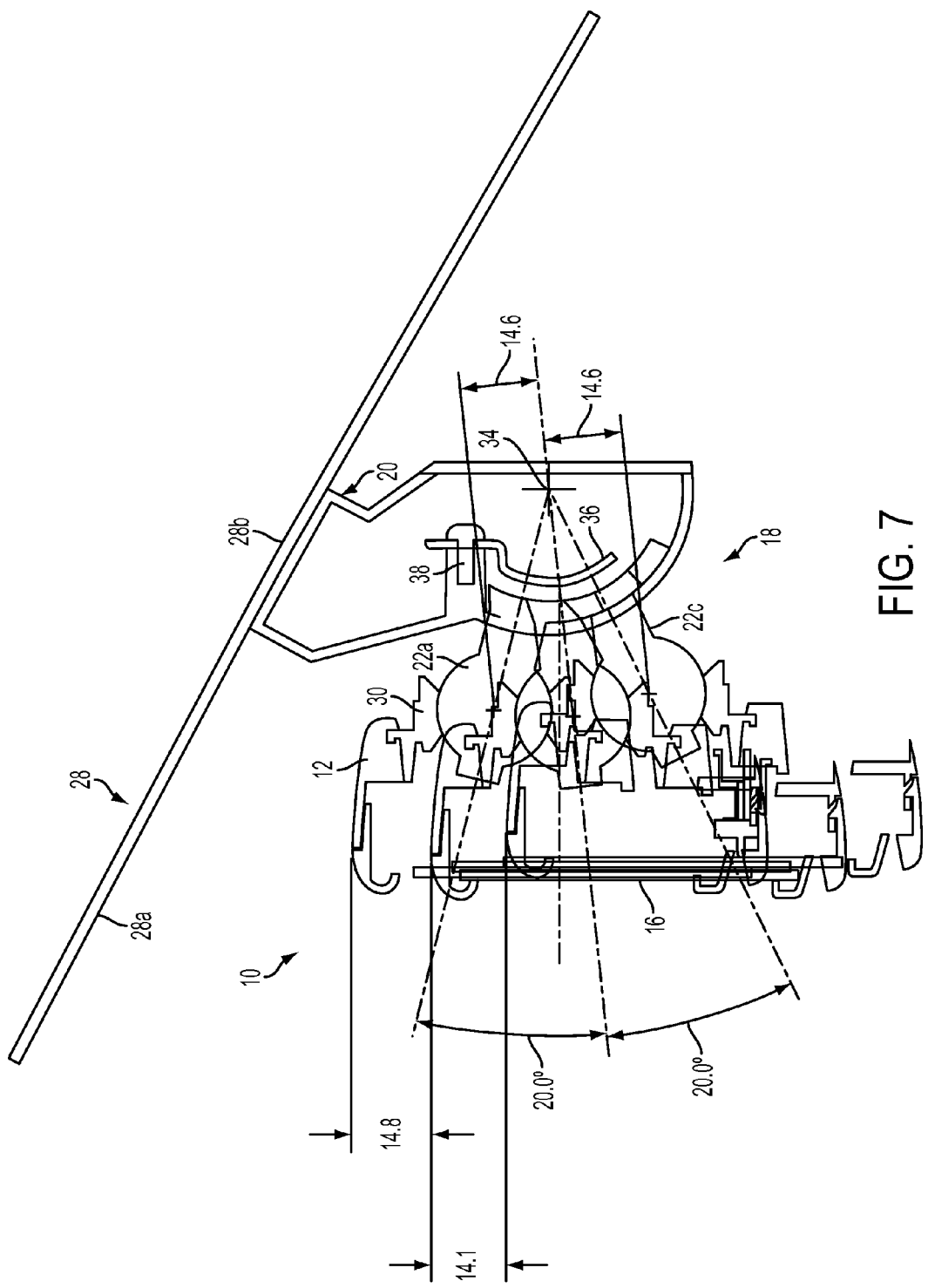
FIG. 7 is another side elevation and partial section view of the interior rearview mirror assembly and mounting structure of FIG. 1, showing the range of adjustment of the mirror casing and reflective element about the base joint.
Figure 8:
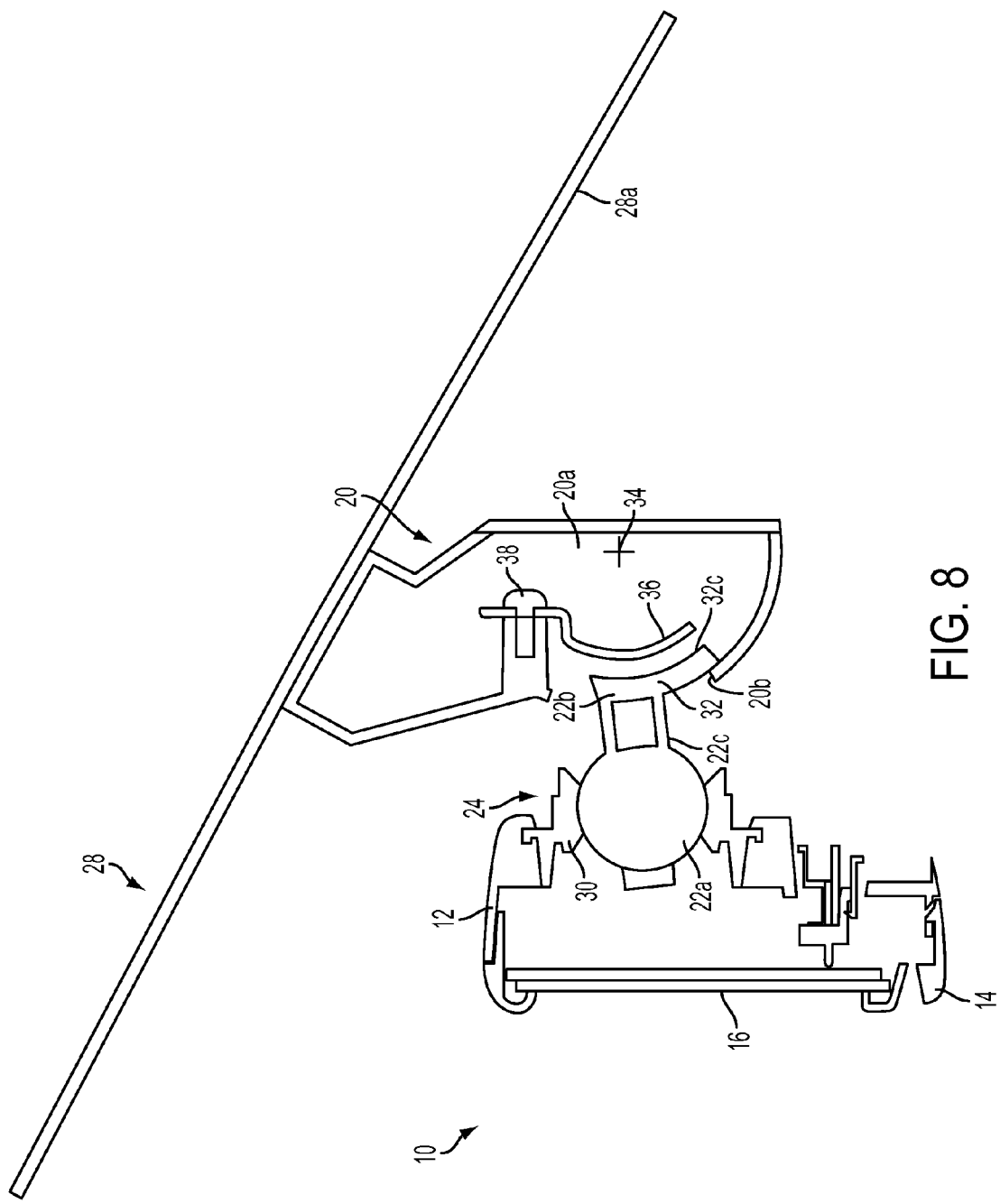
FIG. 8 is a sectional view of the interior rearview mirror assembly and mounting structure taken along the line A-A in FIG. 5.
Figure 9:
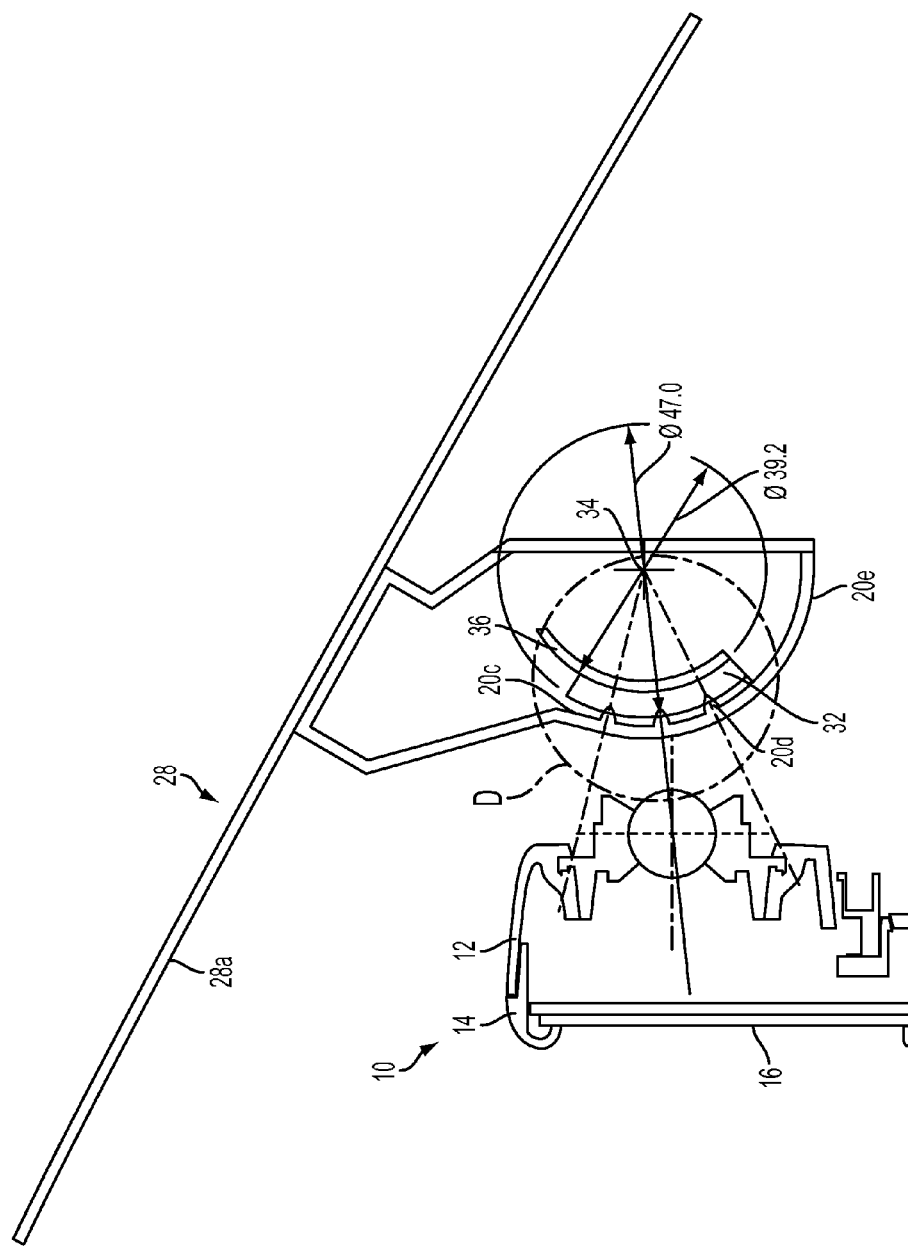
FIG. 9 is a sectional view of the interior rearview mirror assembly and mounting structure taken along the line B-B in FIG. 5.

The opposite end or base end 22b of mounting arm 22 comprises an arcuate or curved or cylindrical or partially cylindrical element or member 32 (as best shown in FIGS. 6-9) that is received within lower region 20a of mounting base 20 and that extends laterally within the mounting base with a substantially constant radius of curvature relative to a horizontal axis 34), with the arm portion 22c of mounting arm 22 extending through slot 20b of mounting base 20. The cylindrical element may be integrally molded with the plastic or polymeric mounting arm portion and ball member or the arm portion may be attached to the cylindrical element, such as via a fastener or the like. The cylindrical element or member 32 includes an outer surface 32a that engages an inner surface 20e of a rearward wall or portion 20e of mounting base 20 to allow for movement of mounting arm 22 about a generally horizontal pivot axis 34 (FIG. 7) while limiting movement of mounting arm 22 about other axes. As shown in FIGS. 6 and 9, outer surface 32a may include a plurality of spaced apart retaining elements or notches 32b that engage spaced apart retaining elements or projections 20d at inner surface 20c of mounting base 20 to limit pivotal movement of mounting arm 22 about pivot axis 34 when the mounting arm 22 is set at a desired or appropriate position or orientation relative to mounting base 20.

As shown in FIG. 8, mounting base 20 includes a spring element or clamping element 36 disposed within lower region 20a of mounting base 20. Clamping element 36 extends along at least a portion of cylindrical element 32 and may be urged or biased towards and against the inner surface 32e of cylindrical element 32 to urge the outer surface 32a and notches 32b against the inner surface 20c and protrusions or projections 20d of mounting base, such as via adjustment of a fastener or bolt or screw 38 extending through clamping element 36 and into wall or portion 20e of mounting base 20. For example, fastener 38 may be adjusted or tightened to draw clamping element or spring 36 towards the inner surface 20c of mounting base 20 to draw or urge cylindrical element 32 towards inner surface 20c and to draw or urge the notches 32b into engagement with the projections 20d, whereby further tightening of the screw or fastener substantially secures the cylindrical element 32 relative to the mounting base 20 and thus limits or substantially precludes further vertical adjustment of mounting arm 18 about pivot axis 34 (whereby adjustment of the rearward field of view of the reflective element is accomplished via adjustment of the mirror head about the pivot joint at the opposite end of the mounting arm, such as by the driver of the vehicle when the mirror assembly is normally mounted in the vehicle).

Figure 10:
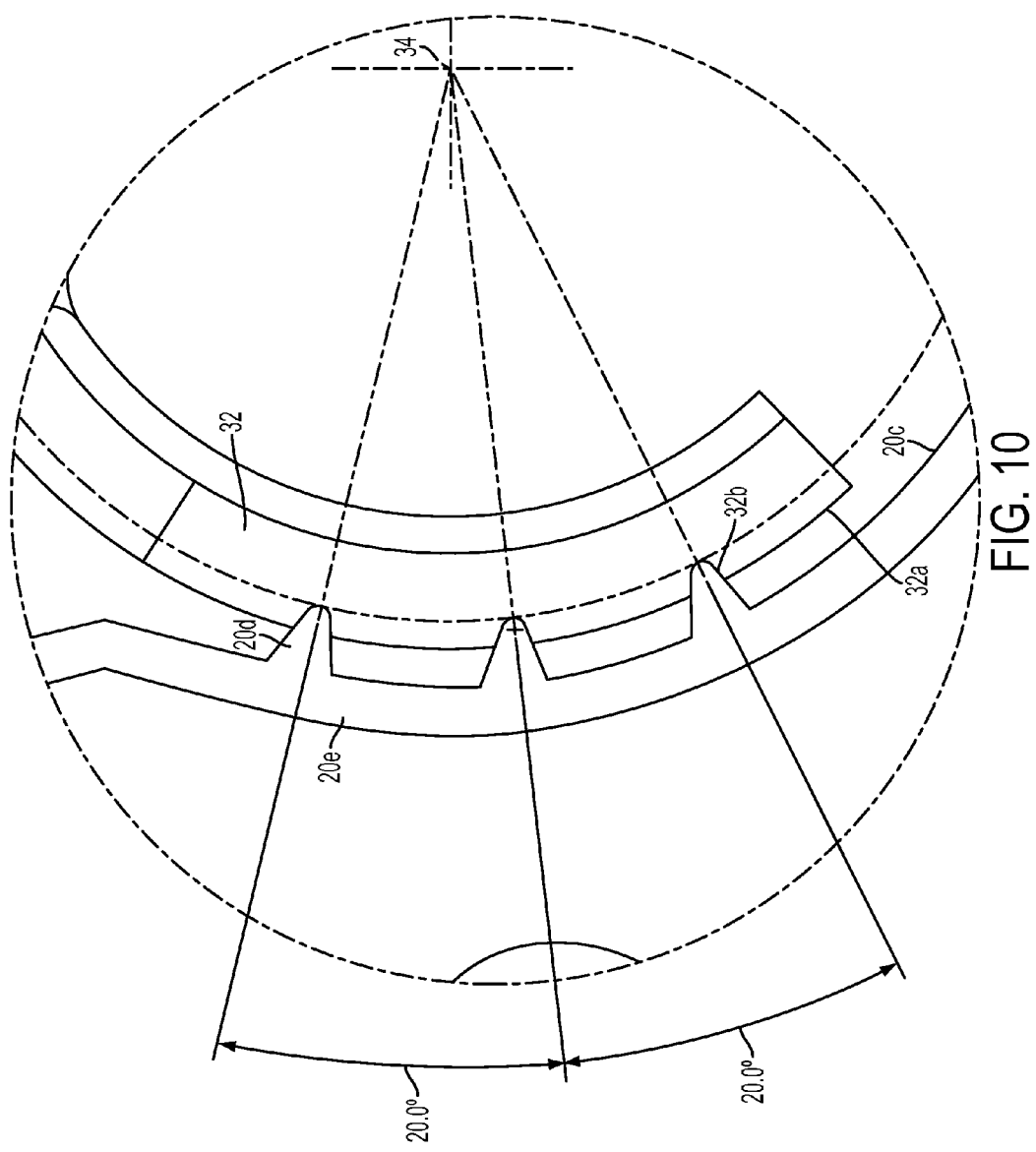
FIG. 10 is an enlarged sectional view of the area D in FIG. 9.

Clamping element 36 may comprise a biasing element or spring element, such as a flexible spring steel material or the like, whereby the clamping element, when urged against the cylindrical element, substantially retains the cylindrical element engaged with the inner surface 20c of mounting base 20, yet the clamping force or urging force of the clamping element may be overcome when a force is applied (such as in a generally upward or downward direction) to the mounting arm that is sufficient to overcome the clamping force (such as by causing the clamping element to flex to allow the cylindrical portion to move away from the wall or portion 20e of mounting base 20) to allow the projections to disengage from the notches to allow for pivotal movement of mounting arm 18 about pivot axis 34. As can be seen in FIG. 10, the notches 32b and projections 20d may be tapered or angled to facilitate the projections riding out of the notches when a sufficient force is applied to the mounting arm. As can also be seen in FIG. 10, there are more notches 32b than projections 20d to allow for the projections (such as three projections) to selectively engage a corresponding set of adjacent notches (such as three adjacent notches) to set the desired or appropriate or selected height or orientation of the mounting arm. Although shown and described as the cylindrical element having notches and the inner surface of the mounting base having projections, clearly the cylindrical element could have projections and the inner surface of the mounting base could have notches without affecting the scope of the present invention.

Thus, for example, the mirror assembly 10 may be manufactured and the mounting arm 22 may be adjusted (about pivot axis 34) relative to mounting base 20 to set a desired height of the mirror reflective element and casing for a particular application or vehicle. Optionally, the fastener 38 may be initially loosened to allow the projections 20d to move out of the notches 32b and thus to allow relative movement between cylindrical element 32 and surface 20c of mounting base 20. When the desired orientation of the mounting arm relative to the mounting base is achieved (that corresponds to the desired or appropriate or selected height of the reflective element and mirror casing when the mirror assembly is normally mounted in a vehicle), the fastener may be tightened to substantially secure the mounting arm in that desired or appropriate or selected orientation relative to the mounting base. Thus, after the mirror assembly is mounted to the interior portion of the vehicle, adjustment of the reflective element by a driver of the vehicle will be substantially limited to adjustment of the mirror casing and/or reflective element about the ball and socket mirror joint 24. However, if desired, further adjustment at base joint 26 may be achieved by either a strong enough force to overcome the spring force of clamping element 36 or by loosening of fastener 38 to allow for such adjustment. Optionally, the fastener and clamping element may be configured so that the fastener head is accessible at the mounting base when the mirror assembly is normally mounted to the vehicle so that the clamping element and base joint may be adjusted by adjusting the fastener (and retightening the fastener and/or clamping element) after the mirror assembly is mounted to the vehicle.

As shown in FIG. 7, the base joint 26 thus may allow for a range of vertical adjustment of mirror casing 12 and reflective element 16 to set the mirror casing and reflective element at a desired or appropriate height for the particular application or vehicle to which the particular mirror assembly will be mounted. In the illustrated embodiment, the base joint allows for about a 40 degree range of pivotal movement of the mounting arm 22 about pivot axis 34, which may account for about a 29.2 mm range of vertical adjustment of the ball member 22a of mounting arm 22 and about a 28.9 mm range of vertical adjustment of the mirror casing 12. However, other ranges of adjustment may be achieved via adjustment of the size of the slot at mounting base and/or the radius of curvature of the cylindrical element and rear wall of mounting portion and/or the like, without affecting the scope of the present invention. Optionally, and as shown in FIG. 10, the notches and projections may be spaced apart by about 20 degrees (relative to the pivot axis 34) to allow for 20 degree increments of adjustment. However, clearly, the notches and projections may be spaced closer together to provide finer adjustment increments or may be spaced further apart to provide coarser adjustment increments while remaining within the spirit and scope of the present invention.

Figure 11:
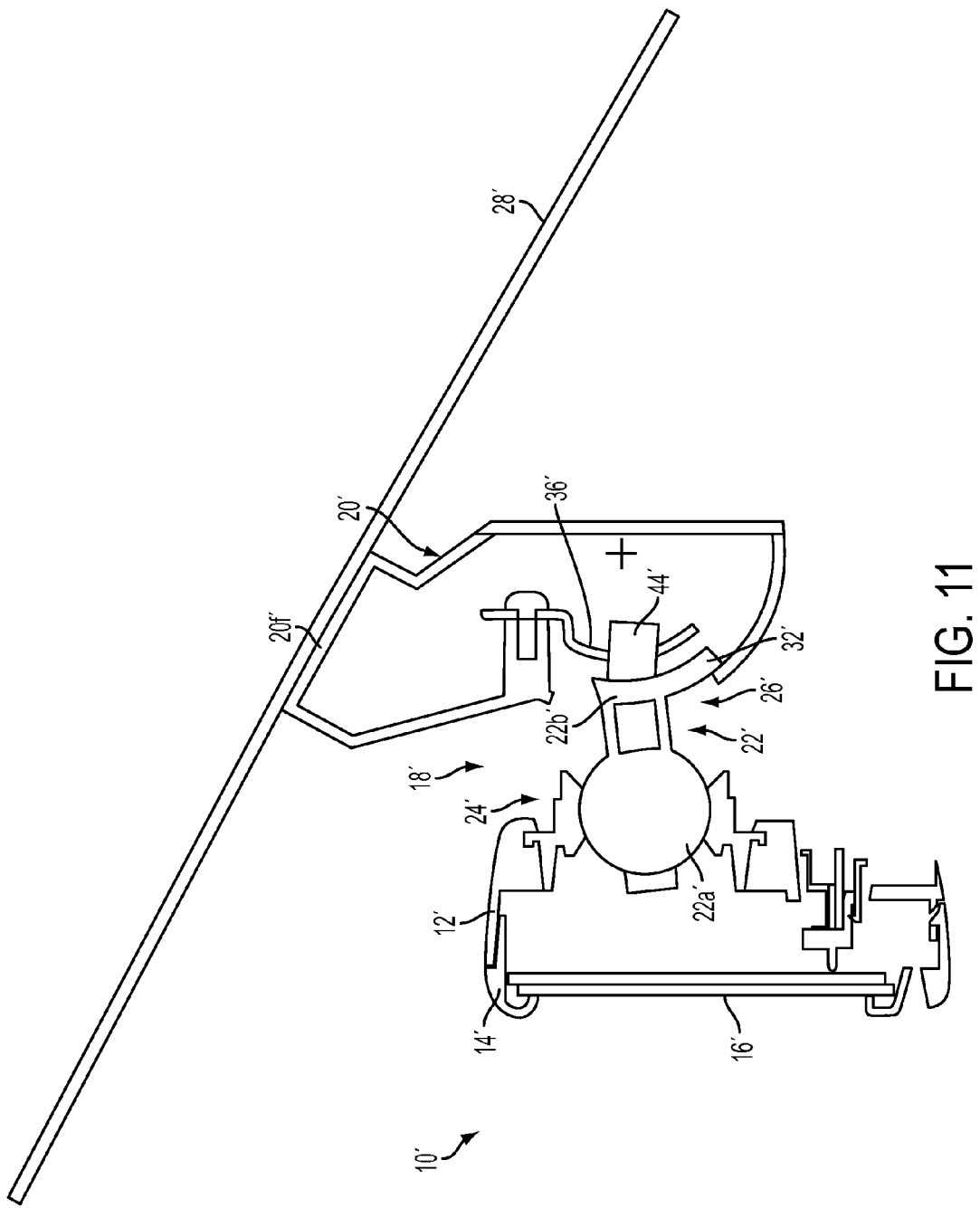
FIG. 11 is a sectional view similar to FIG. 8, showing a camera mounted to or movable with the mounting arm.

Optionally, and with reference to FIG. 11, an interior rearview mirror assembly 10' for a vehicle includes a casing 12', a bezel portion 14' and a reflective element 16' positioned at and at least partially within the casing and/or bezel portion. Mirror assembly 10' is adjustably mounted to an interior portion of a vehicle (such as to an interior surface of a vehicle windshield or a headliner of a vehicle or the like) via a single ball pivot mounting configuration or assembly 18'. Mounting assembly 18' includes a base portion or mounting base 20' and a mounting arm 22', with the reflective element 16' and mirror casing 12' pivotally mounted at an outer or rearward or mirror or ball end 22a' of mounting arm 22' about a first or mirror ball pivot joint 24' (such as a ball and socket joint or the like that allows for a driver of the vehicle to which mirror assembly 10' is mounted to adjust the reflective element vertically and horizontally to adjust the rearward field of view of the driver), with the opposite or forward or base end 22b' of mounting arm 22' being adjustably mounted to mounting base 20' about a second or adjustable or base joint 26', which allows for vertical adjustment of the reflective element 16' with limited or no side-to-side or lateral adjustment of the reflective element 16' at base joint 26', and whereby the mounting arm 22' may be secured or retained relative to the mounting base at base joint 26' to limit adjustment of the mounting arm relative to the mounting base when the mirror casing and reflective element are set at a desired or appropriate orientation relative to the mounting base to locate the mirror casing and reflective element at a desired or appropriate height when the mirror assembly is normally mounted in the vehicle, such as in a similar manner as discussed above with respect to mirror assembly 10. Mirror assembly 10' includes an accessory 44', such as a forward facing camera or imaging sensor or the like, which may be fixedly attached or connected to a base end of mounting arm 22', such as to or at the cylindrical portion 32' that is received in base portion 20' and that is secured relative to the base portion 20', such as via a clamping element 36' (such as in a similar manner as described above), to secure mounting arm 22' relative to base portion 20' when the mirror head or mirror casing and reflective element are set to a desired height and/or angle relative to the vehicle windshield.

Thus, when the mirror assembly 10' is mounted in a vehicle such as to an interior surface of a vehicle windshield (which may be at a particular angle relative to horizontal depending on the particular vehicle application of the mirror assembly), the mounting arm 22' may be adjusted relative to the mounting base 20' to set the mirror casing at a desired angle and/or height for that particular vehicle application (this preset or adjustment may be done when the mirror assembly is mounted in the vehicle or before installation of the mirror assembly in the vehicle, such as at the mirror manufacturing facility or the like, to preset the mirror assembly for its particular designated vehicle application). When the mirror mounting arm 22' and mirror casing and mirror reflective element are set in this manner, the camera 44' may likewise be set so as to be at a desired angle relative to horizontal so as to have the desired forward field of view through the windshield and in the forward direction of travel of the vehicle when the mirror assembly is normally mounted at the vehicle. Thus, the angle of the mounting arm relative to the mounting base (and thus relative to the angle of the mounting surface 20f of the mounting base 20' and thus relative to the angle of the windshield 28' to which the mounting base will be attached) may be set or selected prior to or following the mirror assembly being mounted to the interior surface of the vehicle windshield, whereby the mounting arm may be substantially retained or secured relative to the mounting base when at the selected or desired or appropriate angle. When so set, the mirror assembly (and forward facing camera and/or other accessory mounted at the pivot arm) is set for a particular vehicle application or line or platform, and with the mounting angle of the mounting base set for the particular windshield angle of the particular or selected or targeted vehicle line or lines or platforms.

Because the mounting angles may be preset or preselected to accommodate for the windshield angle to which the mirror assembly is mounted, and because the mounting arm may be substantially retained in its preset orientation relative to the mounting base at the windshield (whereby adjustment of the rearward field of view of the reflective element is accommodated by pivotal movement at the mirror ball pivot joint 24'), the camera is also substantially retained with the desired or appropriate forward field of view through the vehicle windshield and at a desired or appropriate angle relative to the vehicle windshield and relative to horizontal, so that the camera will capture images of the desired or selected scene (such as images of moisture on the windshield for rain sensor applications or such as images of the scene occurring forwardly of the vehicle and in the direction of travel of the vehicle for forward vision systems such as automatic headlamp control systems or lane departure warning systems and/or the like). For example, and as can be seen with reference to FIG. 11, for a vehicle windshield at the illustrated angle, the base pivot joint may be adjusted (such as via a technician or operator at a mirror assembly facility or vehicle assembly facility or the like) to set the camera to have a generally horizontal viewing angle (and maybe a slightly downward angle or a slightly upward angle depending on the application and function of the camera) when the mirror assembly is mounted to the vehicle windshield. However, if the mirror assembly were targeted or selected to be mounted to a vehicle windshield (such as for a different vehicle platform) that was at a greater angle (or lesser angle) relative to horizontal, then the mounting arm (and camera mounted thereto) may be adjusted relative to the mounting base to accommodate the different windshield angle and vehicle platform, while still providing a generally horizontal (or slightly downward angled) forward field of view of the camera, without having to provide a different mounting construction or components thereof.

In applications where such a camera may be used for such forward vision systems, it may be desirable to have the camera viewing angle at a slightly downward angle relative to horizontal when, the camera is normally mounted in the vehicle, and it is desirable that the field of view of the camera is not changed by adjustment of the rearward field of view of the mirror reflective element by the driver of the vehicle. Although shown and described as a camera, clearly other accessories (such as, for example, a compass sensor or sensors or the like) may be mounted at or to the forward or base end of the mounting arm to provide an adjustable, yet substantially fixed or stable mounting, of the accessories to set the accessories at the desired or appropriate angle relative to the vehicle windshield and/or horizontal plane for the particular application and/or vehicle platform. Thus, the present invention provides an adjustable mounting configuration that allows the mirror manufacturer or vehicle manufacturer to adjust an angle of the mounting arm and camera field of view relative to the vehicle windshield so that the mirror assembly is suitable for a variety of applications (with different windshield angles) for use on a selected vehicle platform without requiring different parts or components or tooling. The camera (and/or circuit board or accessory mounted to the base end portion of the mounting arm) thus moves with the base angle setting to establish or maintain the horizontal or selected setting or angle of the camera or accessory. The present invention thus provides a common mirror mounting assembly for multiple vehicle lines or platforms while providing enhanced mounting angles and heights for the common mirror assembly for the particular selected applications or vehicle platforms.

Although shown and described as a clamping element that is drawn toward the cylindrical element of the mounting arm and toward the rear portion of the mounting base, clearly other means for retaining the mounting arm relative to the mounting base at the base joint may be implemented while remaining within the spirit and scope of the present invention. For example, the clamping element may comprise a fixed portion of the mounting base and a fastener may extend from the fixed portion and engage the mounting arm, whereby adjustment of the fastener may urge the mounting arm away from the fixed portion of the mounting base and towards and into engagement with the inner surface of the mounting base. Optionally, for example, the mounting arm may be adjustable about the horizontal pivot axis and retained in the selected orientation or position via a fastener or set screw or the like that substantially secures the cylindrical element and mounting arm relative to the base portion (such as by engaging or threadedly engaging the base portion and the cylindrical element) to substantially preclude relative movement therebetween.

Figure 12:
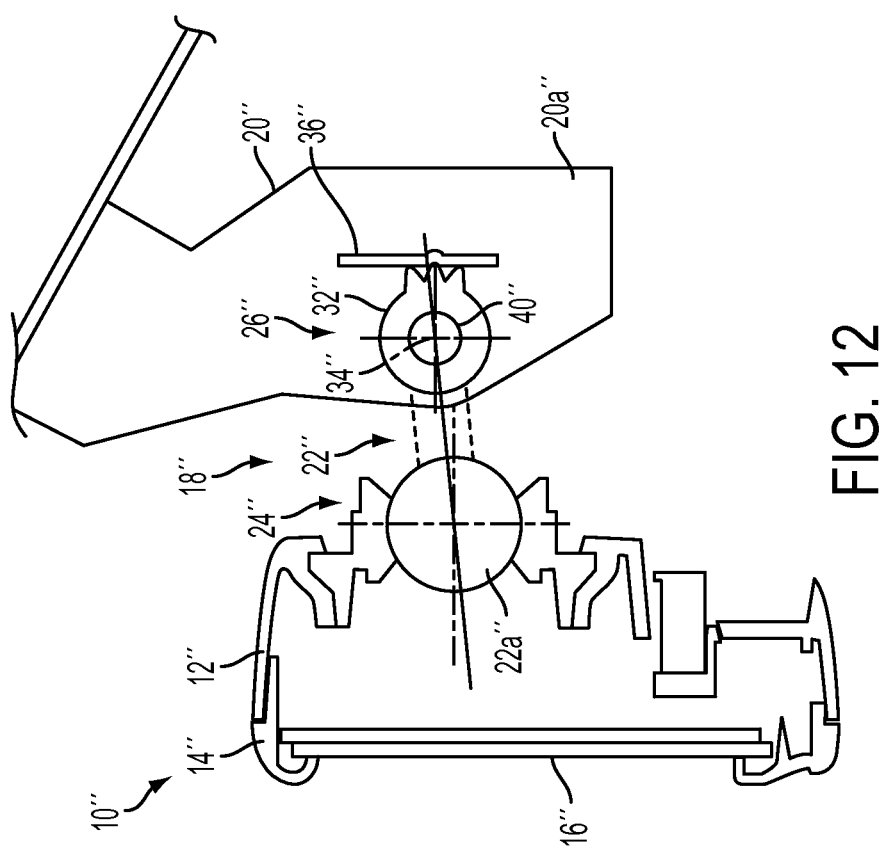
FIG. 12 is a side elevation of another interior rearview mirror assembly and mounting structure of the present invention.
Figure 13:
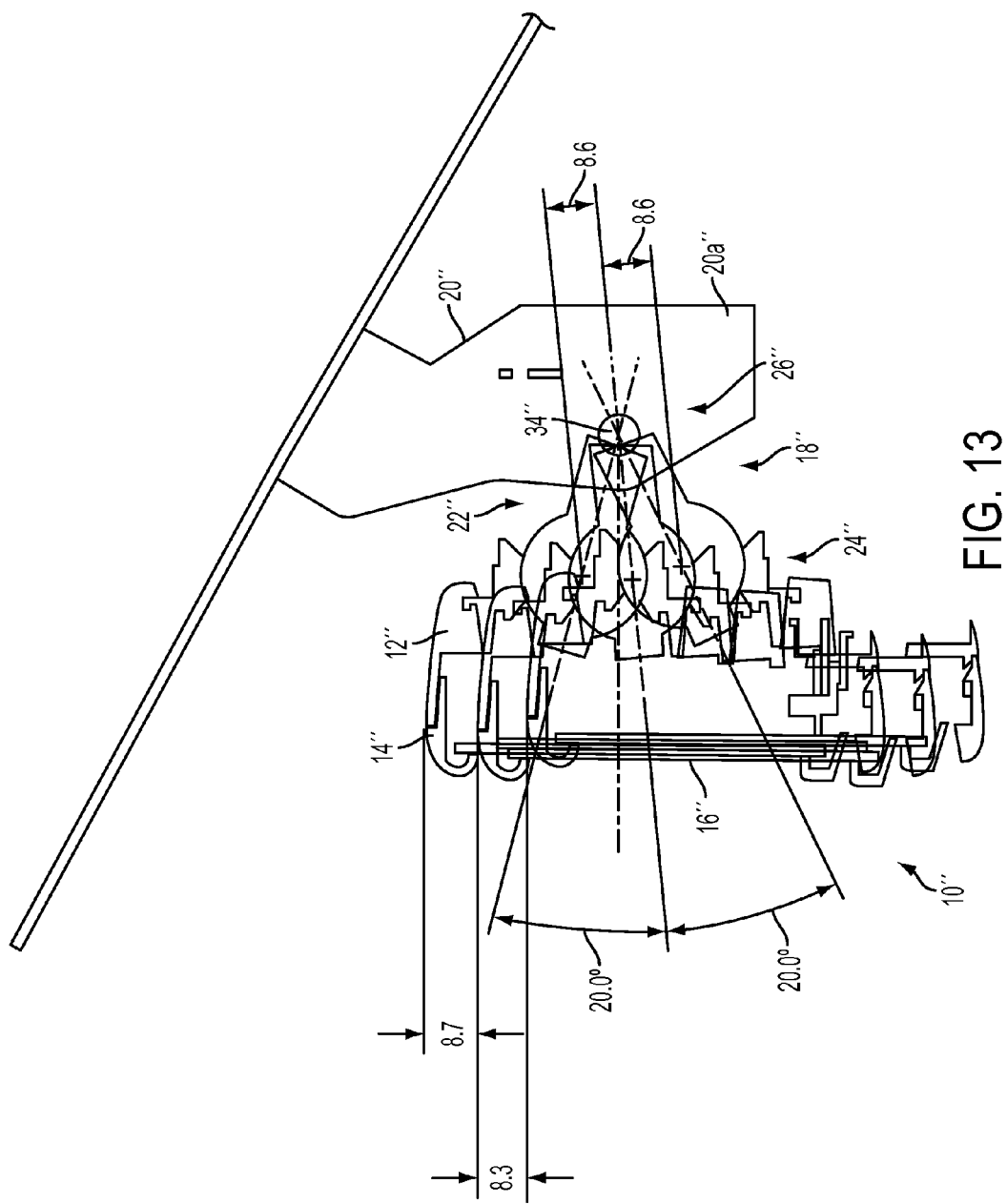
FIG. 13 is another side elevation of the interior rearview mirror assembly and mounting structure of FIG. 12, showing the range of adjustment of the mirror casing and reflective element about the base joint.

Optionally, and with reference to FIGS. 12 and 13, an interior rearview mirror assembly 10" may include a single ball pivot joint mounting configuration or assembly 18" that includes a base joint 26" may include a cylindrical portion 32" that is pivotable about a pivot pin or axle 40" that is disposed within a lower region 20a" of a mounting base 20". The cylindrical portion 32" may include a plurality of projections 32d" that protrude from cylindrical portion 32" and engage corresponding notches or retaining elements at a clamping element 36". Clamping element 36" may be biased or urged towards and into engagement with cylindrical portion 32" (such as via tightening or adjustment of a fastener or the like such as described above) to limit or substantially preclude further adjustment of the cylindrical portion relative to the clamping element (and thus further adjustment of the mounting arm relative to the mounting base) after the desired or appropriate mounting arm-to-mounting base orientation is set or selected.

The interior rearview mirror assembly 10" may otherwise be similar to mirror assembly 10, discussed above, such that a detailed discussion of the mirror assemblies need not be repeated herein. For example, the mirror assembly 10" may include a casing 12", a bezel portion 14" and a reflective element 16" positioned at and at least partially within the casing and/or bezel portion. The reflective element 16" and mirror casing 12" are pivotally mounted at an outer or rearward or mirror or ball end 22a" of mounting arm 22" about a first or mirror ball pivot joint 24" (such as in a similar manner as discussed above).

Figure 24:
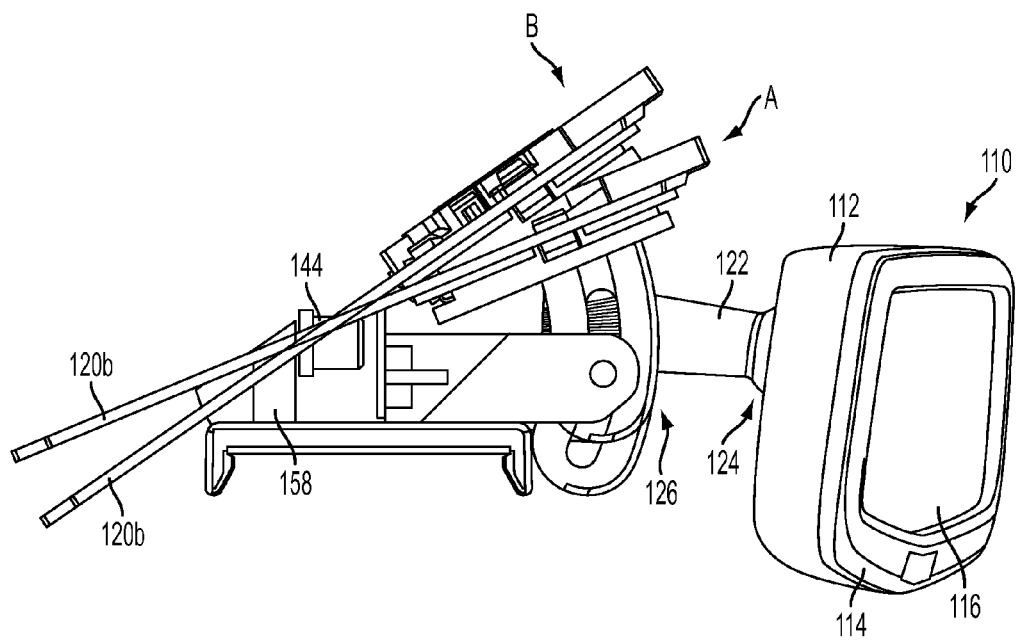
FIG. 24 is a side elevation and perspective view of the interior rearview mirror assembly and mounting structure of FIGS. 14 and 20, showing both windshield angle configurations.

As can be seen in FIG. 13, the base joint 26" may allow for a similar forty degree (or thereabouts) range of pivotal adjustment of the mirror casing and reflective element about a pivot axis 34". Because the pivot axis 34" is at the pivot axle 40" and not toward the front portion of the mounting base (such as pivot axis 34 is in mounting base 20, discussed above), the forty degree pivotal range may provide a reduced range of vertical adjustment of the mirror casing (such as about a 17 mm range of vertical adjustment of the mirror casing as shown in FIG. 24). However, other ranges of vertical adjustment may be achieved while remaining within the spirit and scope of the present invention.

Optionally, and with reference to FIGS. 14-24, an interior rearview mirror assembly 110 for a vehicle includes a casing 112, a bezel portion 114 and a reflective element 116 positioned at and at least partially within the casing and/or bezel portion. Mirror assembly 110 is adjustably mounted to an interior portion of a vehicle (such as to an interior surface of a vehicle windshield or a headliner of a vehicle or the like) via a single ball pivot mounting configuration or assembly 118. Mounting assembly 118 includes a base portion or mounting base or breakaway stay 120 and an adjustable portion 121 that includes a mounting arm 122. The reflective element 116 and mirror casing 112 are pivotally mounted at an outer or rearward or mirror or ball end 122a of mounting arm 122 about a first or mirror ball pivot joint 124 (such as a ball and socket joint or the like that allows for a driver of the vehicle to which mirror assembly 110 is mounted to adjust the reflective element vertically and horizontally to adjust the rearward field of view of the driver). The adjustable portion 121 and mounting arm 122 are adjustably mounted to mounting base 120 about a second or adjustable or base joint 126, which allows for vertical adjustment of the reflective element 116 with limited or no side-to-side or lateral adjustment of the reflective element 116 at base joint 126, and whereby the mounting arm 122 may be secured or retained relative to the mounting base at base joint 126 to limit adjustment of the mounting arm relative to the mounting base when the mirror casing and reflective element are set at a desired or appropriate orientation relative to the mounting base to locate the mirror casing and reflective element at a desired or appropriate height when the mirror assembly is normally mounted in the vehicle.

In the illustrated embodiment, mounting base 120 includes a mounting or attachment portion 120a that attaches to a mounting element or button at the windshield (typically adhesively bonded to the interior surface of the windshield) to mount the mounting assembly and mirror assembly at the windshield. Mounting base 120 includes a windshield facing portion 120b that extends along the interior surface of the windshield when mounting assembly 118 is normally mounted to the windshield. The windshield facing portion 120b may include an aperture 120c therethrough for a camera or imaging sensor 144 to view through, as discussed below. The mounting base 120 includes a pair of arcuate or curved arms 120d that extend from the mounting portion 120a, such as in a generally downward direction from mounting portion 120a when mounting assembly 118 is normally mounted to the windshield. The arms 120d have arcuate slots 120e extending partially therealong for adjustably attaching the adjustable portion 121 thereto, such as via a fastener or pin 146, as discussed below. The arms 120d also have a plurality of teeth or notches 120f (FIGS. 17-19) at their opposed or facing inner surfaces for engaging corresponding teeth of the adjustable portion 121 to retain the adjustable portion 121 and mounting arm 122 relative to the mounting base 120, as also discussed below.

Optionally, the mounting assembly 118 may include an electrical connector 123 at or near the attachment portion 120a and/or windshield facing portion 120b for connecting to a vehicle wiring harness that may extend from the vehicle headliner above the mirror assembly and mounting assembly. The electrical connector 123 may be electrically conductively connected to circuitry or circuit elements or electronic content of the mirror assembly and/or an accessory module or the like disposed at or incorporated at the mounting assembly. For example, and as discussed below, the mounting assembly may support circuit elements or printed circuit boards and/or a camera and/or the like, and a housing or casing (not shown) may be disposed over the mounting assembly and electronic content to contain and encompass and house the electronic content at the vehicle windshield. Optionally, electrical wiring may be routed through the mounting assembly and may be routed along or through the mounting arm (where the mounting arm and ball member may have a hollow passageway formed therethrough for passage of the wire or wires or cable) so as to be electrically conductively connected to circuitry of or in or associated with the mirror assembly (such as to a connector at a printed circuit board within the mirror casing).

Figure 17:
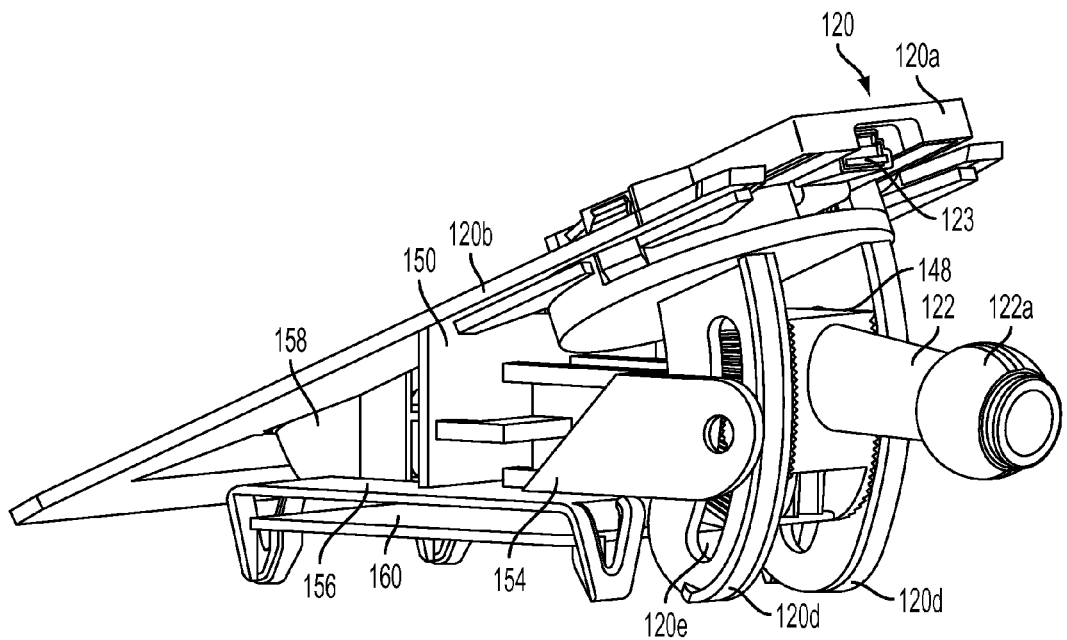
FIG. 17 is another perspective view of the mounting structure of FIG. 14.
Figure 18:
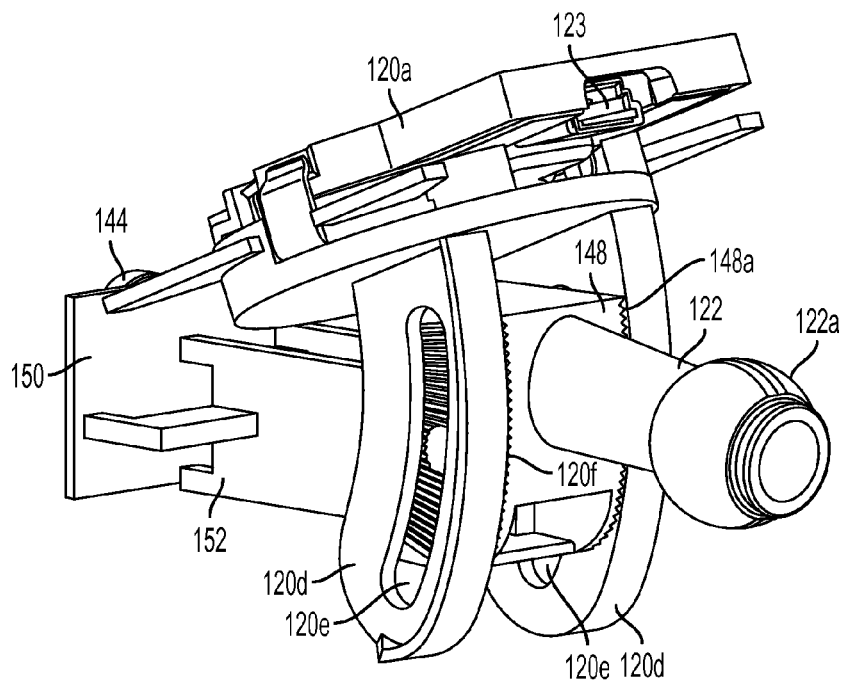
FIG. 18 is another perspective view of the mounting structure of FIG. 14.
Figure 19:
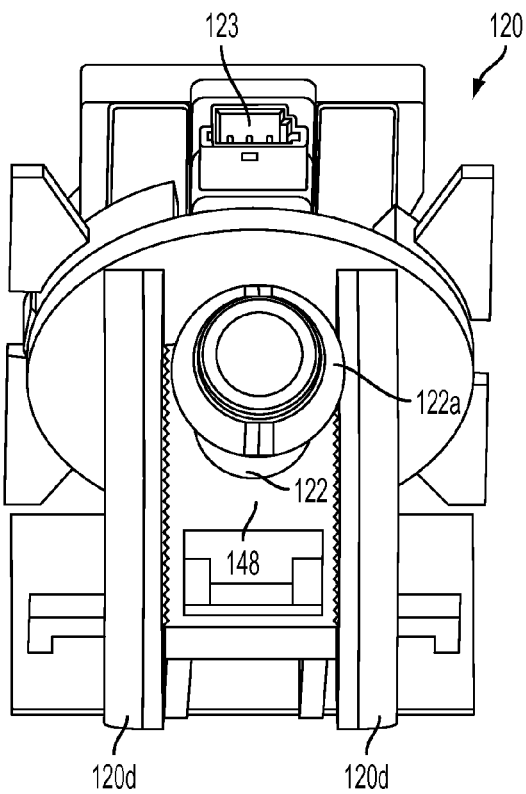
FIG. 19 is an end elevation of the mounting structure of FIG. 14.

In the illustrated embodiment, adjustable portion 121 comprises a block portion 148 that is received between the pair of arcuate arms 120d of mounting base 120 and is adjustable relative thereto to adjust the mounting arm 122 relative to the mounting base 120 and windshield. As best shown in FIGS. 17-19, block portion 148 includes a plurality of teeth 148a that engage the teeth 120f of arms 120d to limit or substantially preclude movement of adjustable portion 121 relative to arms 120d of mounting base 120 when adjustable portion 121 is secured to arms 120d via fastener 146. Mounting arm 122 extends from the rearward portion of block portion 148 and is fixed or retained relative to block portion 148 (and optionally the mounting arm 122 may be unitarily formed with or integrally molded (such as via injection molding) with block portion 148).

In the illustrated embodiment, adjustable portion 121 also includes a forward facing imaging sensor or camera 144 that is mounted at a circuit element or substrate 150 supported at the forward ends of a pair of support arms 152 that extend forwardly from block portion 148. The camera includes a sensor chip or imager chip or sensing element established at the circuit board or element 150, with a lens barrel extending from the chip in the direction of the forward field of view of the sensor. Such cameras are typically used in the likes of automatic headlamp control, lane departure warnings systems, traffic sign recognition systems and/or the like (such as by utilizing aspects of the vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and/or 6,824,281, which are all hereby incorporated herein by reference in their entireties). Thus, it is important that the field of view of the camera, when mounted in the vehicle, is directed towards the desired or targeted area forward of the vehicle. The mounting assembly of the present invention allows for the camera, when mounted in the vehicle, to have the same orientation and field of view relative to horizontal irrespective of the windshield angle of the vehicle to which it is mounted, such that the cameras in different vehicles (having different windshield angles) will have the same or substantially the same fields of view through their respective windshields.

The sensor is supported by the mounting assembly in an orientation relative to the windshield that provides the desired or appropriate field of view for the sensor. The field of view of the sensor is set or preset to the desired direction during the setting of the mounting assembly angle for the particular windshield angle of the windshield at which the mounting assembly is mounted. Although shown and described as an imaging sensor or camera, it is envisioned that the mounting assembly may support any suitable or appropriate or selected sensor or accessory, such as a radar sensor, a photosensor, a lidar sensor or the like, while remaining within the spirit and scope of the present invention. Optionally, for example, the sensor may utilize aspects of the sensors and/or systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,480,149; 7,362,237; 7,038,577; 6,353,392; 6,320,176; 6,313,454; and/or 6,824,281, and/or U.S. patent application Ser. No. 11/721,406, filed Jun. 11, 2007, now U.S. Pat. No. 8,256,821, and/or PCT Application No. PCT/US08/51833, filed Jan. 24, 2008 and published Oct. 23, 2008 as International Publication No. WO 2008/127752, and/or U.S. provisional applications, Ser. No. 61/180,257, filed May 21, 2009; Ser. No. 61/174,596, filed May 1, 2009; Ser. No. 61/156,184, filed Feb. 27, 2009; and/or Ser. No. 61/303,054, filed Feb. 20, 2010, which are all hereby incorporated herein by reference in their entireties. The sensor or camera may capture image data that will be processed to control or provide input to, for example, one or more image-based systems, such as a headlamp control system or climate control system or electrochromic mirror control system or collision avoidance system or a lane departure warning system or adaptive cruise control system and/or the like. Optionally, the video feed or image data can be fed to control circuitry in the mirror head, such as via wires that may be routed through the mounting arm, surrogate adjustment joint and/or pivot joint of the mounting assembly (such as by utilizing aspects of the wire management systems described in U.S. Pat. No. 7,510,287 and/or U.S. patent application Ser. No. 11/226,628, filed Sep. 14, 2005 and published Mar. 23, 2006 as U.S. Publication No. 2006/0061008, which are hereby incorporated herein by reference in their entireties). Optionally, the camera may be otherwise disposed at or near the mirror assembly and/or the image data may be otherwise fed to control circuitry at or near the mirror head.

Figure 14:
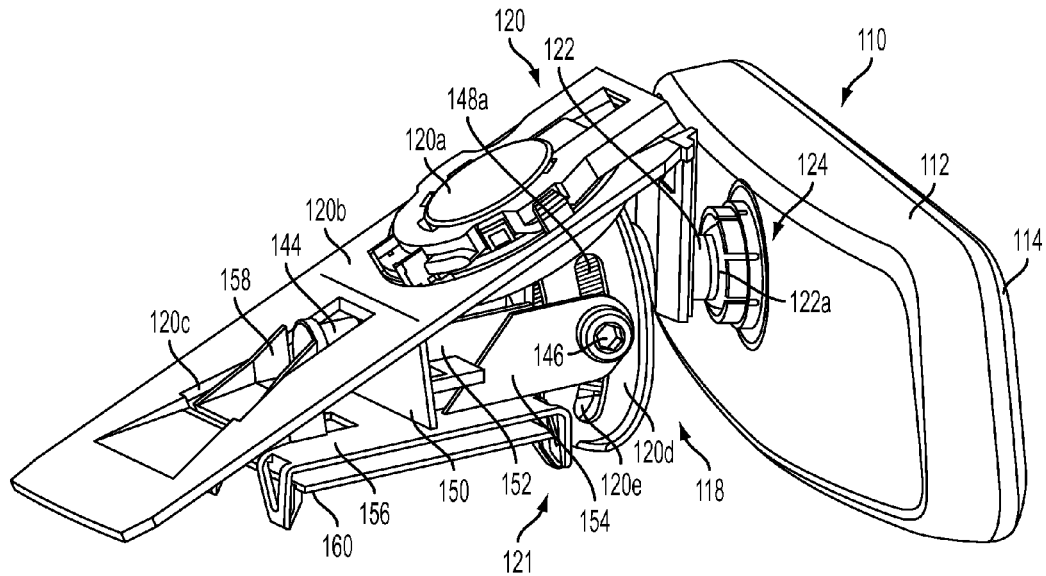
FIG. 14 is a perspective view of another interior rearview mirror assembly and mounting structure of the present invention, shown as adapted for a selected windshield angle.
Figure 15:
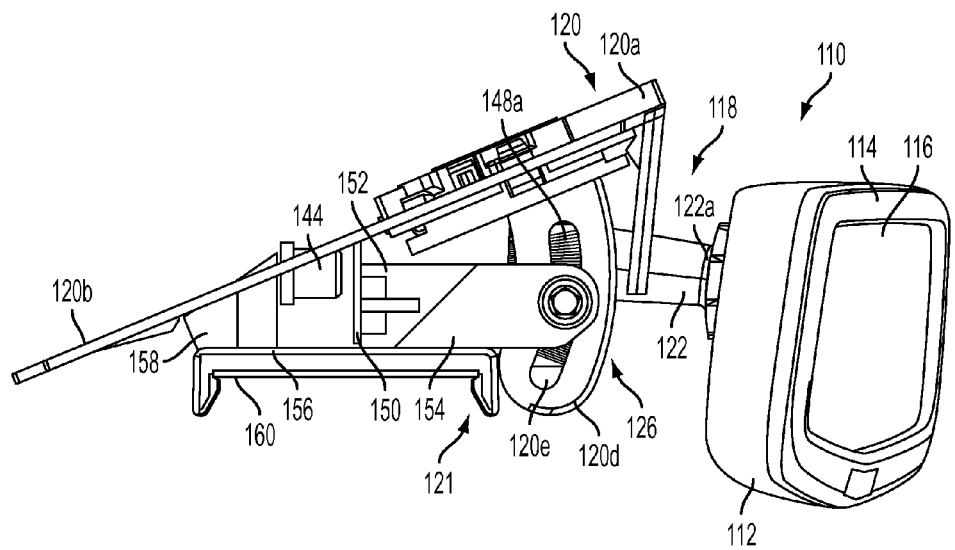
FIG. 15 is a side elevation and perspective view of the interior rearview mirror assembly and mounting structure of FIG. 14.
Figure 16:
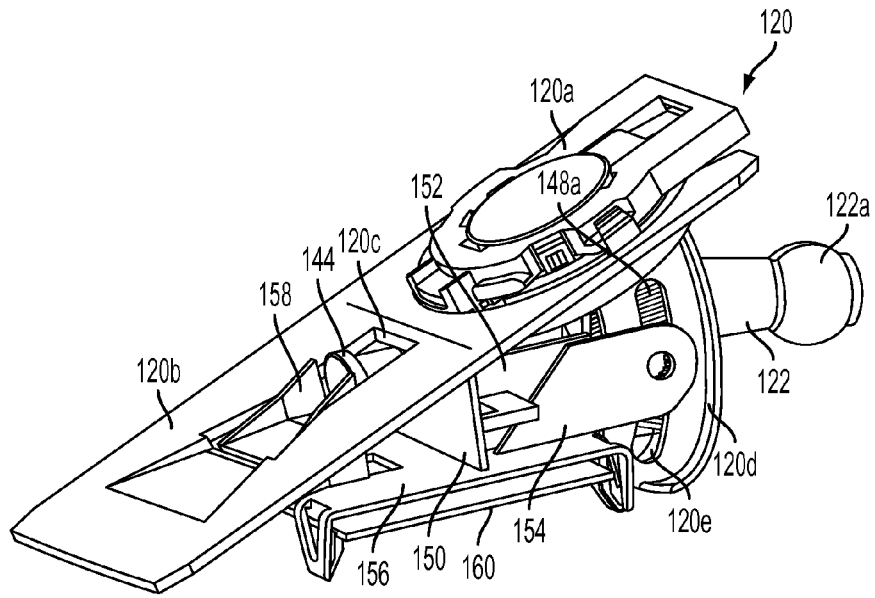
FIG. 16 is a perspective view of the mounting structure of FIG. 14.

In the illustrated embodiment, a pair of support arms 154 are disposed at and extend forwardly from the arcuate curved arms 120d of mounting base 120 and may be attached thereto via fastener 146 so that the support arms 154 are adjusted along arcuate arms 120d with block portion 148 and mounting arm 122. As shown in FIGS. 14-17, support arms 154 support or attach to a platform or substrate 156 that supports includes an aperture or shield element 158 that extends upward from platform 156 to frame a viewing aperture for the forward facing camera 144. As can be seen in FIGS. 14-16, shield element 158 and a portion of camera 144 (such as a portion of a lens that extends forwardly from an imaging sensor or chip or plane at the circuit element 150) may protrude partially through aperture 120c of windshield facing portion 120b of mounting base 120. Optionally, the platform 156 may support a circuit element 160, such as a printed circuit board or the like, or other electronic circuitry or accessory, so as to provide the desired electronic content at the mounting assembly or windshield module.

Thus, the mounting base 120 may be attached to a windshield mounting button or the like at an interior surface of a vehicle windshield. The fastener 146 may be loosened to allow for movement or adjustment of block portion 148 relative to arcuate arms 120d. Optionally, the block and mounting base may be configured to be readily set at one of a plurality (such as two or three or four or more) of presets or orientations for particular vehicle applications (such as via two or more detents or the like), while also providing for finer adjustment of the orientation between the presets to further allow for adjustment or fine tuning of the mounting arm and accessory orientation relative to the vehicle windshield before or after the mounting base is attached at the vehicle windshield of the equipped vehicle. As block portion 148 is moved upward or downward relative to arcuate arms 120d, the support arms 152 and camera 144 are also moved or adjusted relative to the mounting base and thus relative to the vehicle windshield. Also, as the block portion 148 is adjusted relative to the arcuate arms 120*d*, the fastener or pin 146 moves along the arcuate slots 120*e* of arcuate arms 120*d* and thus also moves support arms 154, which in turn moves or adjusts the position of platform 156 and shield element 158 relative to the mounting base 120 and the vehicle windshield.

Thus, the camera 144 and shield element or aperture element 158 are adjusted in tandem with the mounting arm 122 so that the mounting arm and camera are readily adjusted and adapted for the particular angle of the windshield to which the mounting base is mounted. For example, for any given windshield angle, the mounting assembly may be adjusted to set the camera to have a generally horizontal (or slightly downward or upward depending on the particular application) forward field of view through the windshield, while the mounting arm is also set to a desired generally horizontal or downwardly angled orientation. Of course, it is envisioned that such adjustments of the mounting arm and the camera can be made independently or separately from one another and/or dual adjustment can be available for both the mounting arm and camera.

Although principally described above in the context of moving or adjusting the mounting arm, the concepts and constructions of the present invention can also be used to allow a technician or dealership or even consumer selection of presets so that the orientation of the camera can be adjusted for the particular vehicle application. It is further envisioned that aspects of the present invention can also be utilized in a windshield electronics module that is separate from the mirror assembly to adjust a camera of the windshield electronics module relative to a mounting angle or windshield angle of the windshield electronics module to preset or adjust the camera orientation for its particular vehicle application.

Because, for a given vehicle or across vehicle lines, windshield angles vary (such as by known increments between the windshield angles of different vehicle lines or platforms), it is preferred that the mounting assembly of the present invention has two or three or four (or other restricted number of) indents or detents to establish a limited number of presets (and optionally with a coding, such as color coding or the like, to indicate the windshield angle application for each of the limited number of presets or detents) for the orientation of the mounting arm and/or camera relative to the windshield of the vehicle to which the mounting assembly is to be mounted. However, for finer or less coarse adjustment to other settings between the limited number of presets, the mounting assembly may have a plurality of teeth or serrations or may have smooth interfaces. The mounting assembly may thus be readily set to one of the limited number of presets, and/or may be set to any other orientation between the established presets, if desired. As the pitch of teeth decreases, the adjustability of the mounting assembly becomes more infinitely or substantially continuously adjustable, and optionally, the teeth or serrations or notches may be eliminated to provide a generally smooth or substantially infinite adjustment of the orientation of the mounting arm and/or camera relative to the windshield to which the mounting assembly is attached (such a feature may be highly suitable for aftermarket applications, where the mounting assembly may be configured or preset for use on a windshield at virtually any windshield angle). Optionally, the mounting assembly may have a spring-loaded clamping means or a screw type clamping or retaining means or the like to frictionally retain or otherwise clamp/secure the mounting arm and/or camera at the desired or appropriate or preselected orientation.

In a conventional single ball mounting configuration, there is only one pivot joint provided for adjustment of the mirror head relative to the vehicle windshield (with little or no adjustability of the vertical or lateral position of the mirror head relative to the vehicle windshield). In a two ball or double ball or double pivot mounting configuration, there are two pivot joints provided, so that pivotal movement of the arm relative to the mounting base allows for vertical and lateral adjustment of the position of the mirror head relative to the vehicle windshield, and pivotal movement of the mirror head relative to the mounting arm allows for adjustment of the rearward field of view of the driver as reflected off the reflective element. The present invention provides a surrogate or quasi adjustment means. In accordance with the mounting assembly of the present invention, the mirror head is freely adjustable by the driver about the pivot joint or ball joint to adjust the rearward field of view, while the base adjustment or surrogate adjustment means is constructed so that once set (and unless affirmatively readjusted or reset, such as by a technician or at the mirror manufacturing facility or the like) the setting or preset is established and the mounting arm remains at this setting and at the desired present orientation relative to the vehicle windshield throughout normal driving conditions and during vibrations and climate extremes experienced by the vehicle, unless affirmatively adjusted or reset. The base joint may be set once (such as by a technician or at the mirror assembly facility or vehicle assembly facility) and retained at that setting via the adjustment element or means, or optionally, the base joint and mounting arm can be adjusted after the initial preset, such as via a technician or service operator (and such as via a tool or the like), such as in situations where repairs or modifications are made to the vehicle, such as installation of a new windshield or addition of an aftermarket camera or the like.

The quasi-adjustment element or means of the mounting assembly of the present invention provides a means to customize or readjust the mirror and/or camera relative to the mounting button or mounting structure to which the base of the mirror mounting assembly is attached when the mirror assembly is normally mounted in a vehicle. For example, such an adjustment may be suitable for when a windshield is broken and needs to be replaced (whereby the camera and/or mounting arm may require minor adjustment to reset the camera and/or mounting arm to the desired orientations), or for when the camera is replaced or newly installed or serviced or adjusted (whereby the camera orientation may be adjusted to establish or re-establish the desired or appropriate forward field of view), or for at a mirror or windshield electronics module (WEM) manufacturing facility, where one setting may be selected for a first windshield angle (such as for a mirror or WEM designated for a first vehicle, such as, for example, a Ford Fusion) and another setting may be selected for a second windshield angle (such as for a mirror or WEM designated for a second vehicle or vehicle line or platform, such as, for example, a Ford Taurus).

Figure 20:
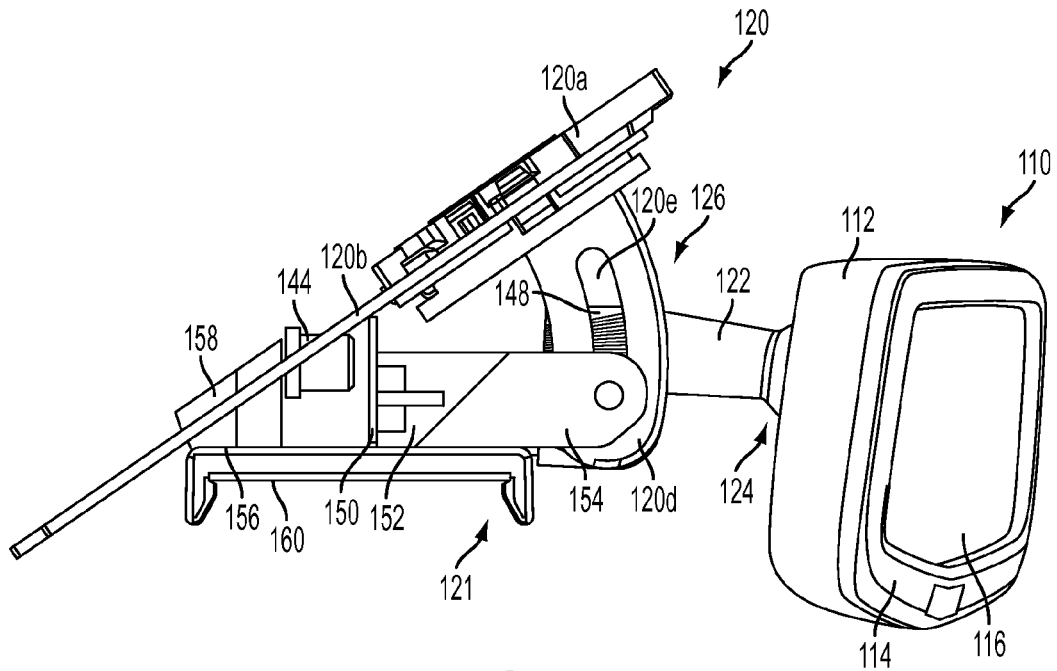
FIG. 20 is a side elevation and perspective view of the interior rearview mirror assembly and mounting structure of FIG. 14, shown as adapted for a greater windshield angle.
Figure 21:
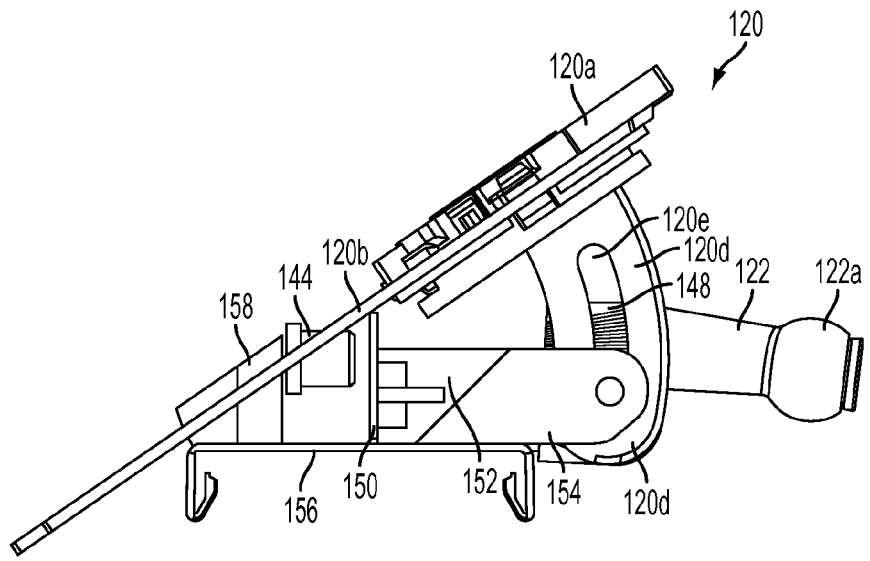
FIG. 21 is a side elevation of the mounting structure of FIG. 20.
Figure 22:
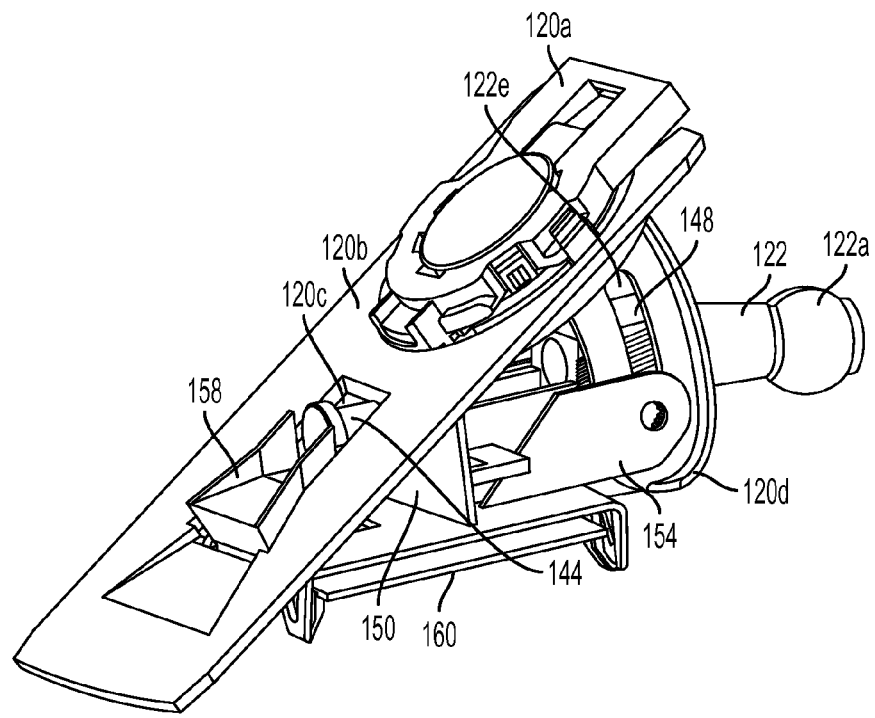
FIG. 22 is a perspective view of the mounting structure of FIG. 20.
Figure 23:
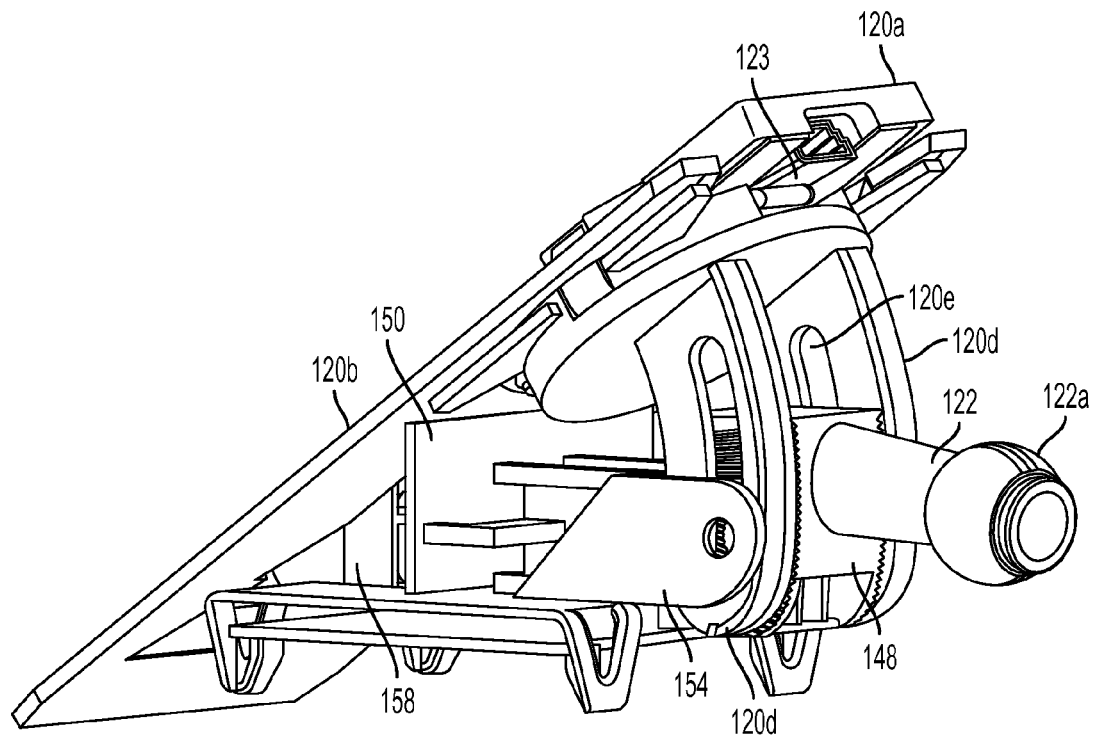
FIG. 23 is another perspective view of the mounting structure of FIG. 20.

With reference to FIGS. 14-17 and 20-24, two exemplary settings are shown. In FIGS. 14-17, the mounting assembly is set for a windshield angle of about 22 degrees or thereabouts, while in FIGS. 20-23, the mounting assembly is set for a windshield angle of about 35 degrees or thereabouts (with FIG. 24 showing the 22 degree windshield angle setting referenced at A and the 35 degree windshield angle setting referenced at B). As can be seen in FIG. 24 and by comparing FIGS. 14-17 with FIGS. 20-23, the angle of the windshield facing portion 120*b* of mounting base 120 is set to generally correspond with the windshield angle, while the mounting assembly is adjusted in each case to provide generally the same orientation (relative to a horizontal plane) for both the camera 144 and the mounting arm 122. As can be seen in FIGS. 20-22, the aperture element or shield element 158 protrudes further through aperture 120c of windshield facing portion 120b when the mounting assembly is adapted for the greater angle windshield. The aperture element thus functions to maintain a frame at the camera to provide the desired field of view for the camera irrespective of the angle of the windshield facing portion and of the windshield to which the mounting assembly is attached or mounted.

Figure 25:
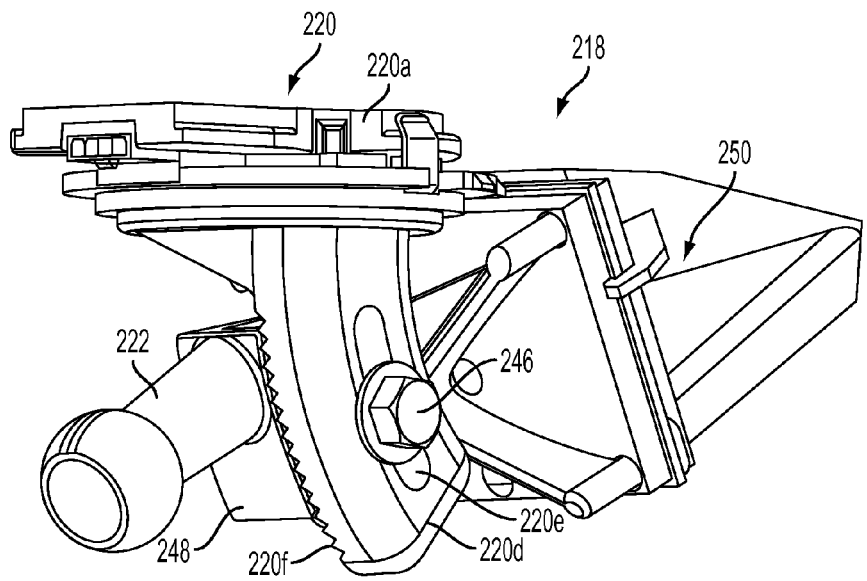
FIG. 25 is a perspective view of another mounting structure of the present invention.
Figure 26:
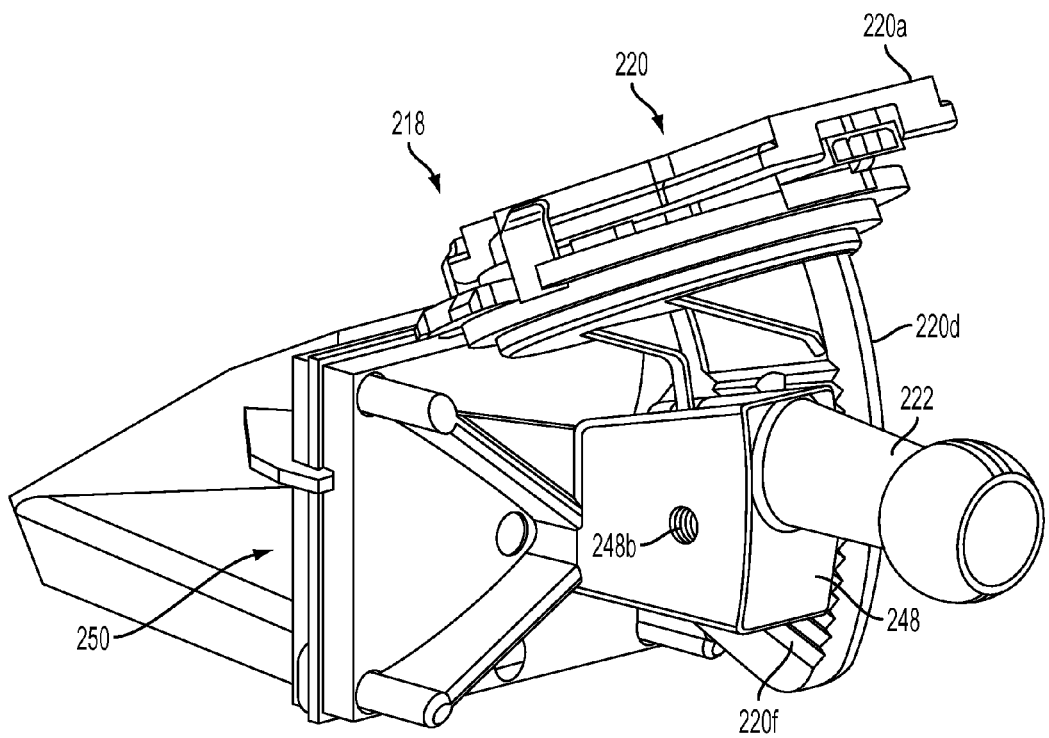
FIG. 26 is another perspective view of the mounting structure of FIG. 25.
Figure 27:
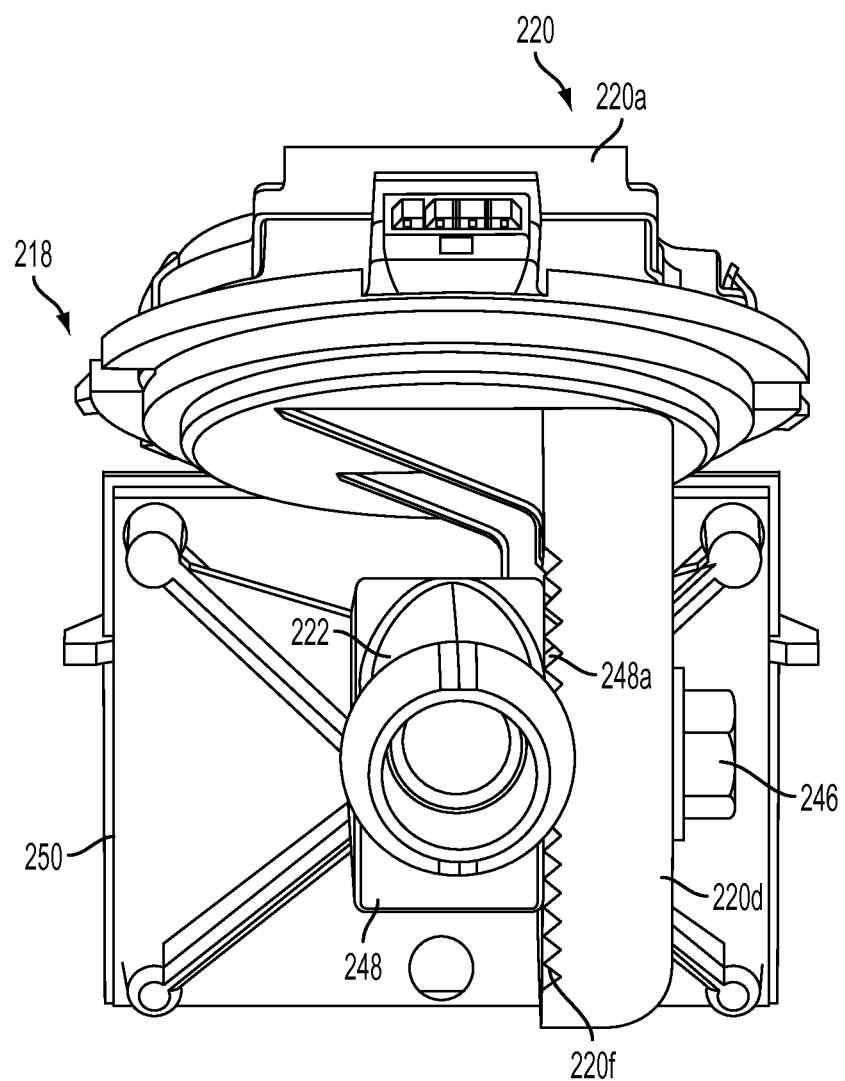
FIG. 27 is an end elevation of the mounting structure of FIG. 25.

Optionally, and with reference to FIGS. 25-27, the mounting assembly 218 may have a fixed portion 220 that includes a single arcuate arm 220d extending downward from the attachment or mounting portion 220a. In the illustrated embodiment, the single arm 220d includes a plurality of teeth 220f for engaging the teeth 248a of the block portion 248 of the adjustable portion 221. A pin or fastener 246 may be inserted through the arcuate slot 220e of arm 220d and into an aperture or passageway 248b of block portion 248. Optionally, and as can be seen in FIG. 26, passageway 248b of block portion 248 may be threaded, whereby the fastener 246 may be threaded into the threaded passageway 248b and tightened to secure the block portion 248 relative to arcuate arm 220d, whereby the mounting arm 222 (which may extend from and/or may be unitarily formed with block portion 248) is set at the desired angle or orientation relative to the windshield to which the mounting assembly is mounted. The block portion 248 may support a camera and aperture element or shield element and/or other circuit elements or the like, such as at a support arm or panel 250 disposed at a forward end of block portion 248 and adjustable relative to mounting portion 220 in tandem with block portion 248 and mounting arm 222, such as in a similar manner as described above. Mounting assembly 218 may otherwise be substantially similar to mounting assembly 118, discussed above, such that a detailed discussion of the mounting assemblies need not be repeated herein.

Therefore, the present invention provides a mounting assembly or configuration for a mirror assembly that allows for a single plane adjustment of the mirror casing and reflective element about a base joint at the mounting base and a 360 degree adjustment of the mirror casing and reflective element about a mirror joint at the mirror casing and/or reflective element. Thus, the present invention provides a limited adjustment base joint that may provide for adjustment at the mounting base in the vertical direction to provide for flexibility in the application of the mirror assembly, while providing a single ball field of view adjustment of the mirror reflective element about an adjustable ball and socket type joint. The adjustment of the mounting arm at the mounting base may be limited to movement generally in one plane and the mounting arm may be locked or secured or retained at the mounting base via a clamp spring or set screw or the like. The repositionable base joint could be set either at the assembly facility (where the mirror assembly is assembled) or by the customer or vehicle manufacturer at the vehicle assembly facility or plant (where the mirror assembly is installed in the vehicle), such as for applications where the vehicle manufacturer wants to buy a single part number for two or more applications. The advantages of the mounting configuration or system of the present invention may include reduced cost, image stability and lower overall investment by the customer. The mounting configuration may maintain a breakaway feature while still accommodating multiple windshield angles and restricted mounting space.

Advantageously, the present invention provides for repair or swap out or replacement of the camera or other accessory incorporated in the mounting assembly or mirror assembly or accessory module. For example, the camera may be removed and a new camera can be installed and the preset angle can be readily reset to provide the desired or appropriate field of view for the camera. Also, the present invention has applicability to aftermarket applications, where a common or universal mounting assembly can be purchased for most vehicles, and can be adjusted (such as by the vehicle owner or dealership or vehicle repair shop, such as a shop that replaces windshields or the like) to accommodate the windshield angle of the vehicle to which it is mounted. For example, a person may purchase a common or universal mirror mounting assembly, and may look up the windshield angle of their vehicle (such as in a lookup table or the like) and may set the pivot angle to the appropriate setting for that windshield angle. The person may then install the mounting assembly to the vehicle windshield whereby the mirror mounting arm and any accessory (such as a camera or the like) associated with the mounting assembly and/or mirror assembly and/or accessory module will be set to the proper or suitable orientation for that vehicle.

Thus, the present invention provides for a mirror manufacturer to utilize common support components or parts for mounting assemblies for mirrors, and allows the mirror manufacturer to set or establish or preset the angle of the mounting arm relative to the mounting base and relative to the windshield or windshield angle of the vehicle at which the mirror assembly will be mounted. The mirror assembly, when installed in the targeted vehicle, will have its mounting aim generally retained in the preset orientation, while the mirror head is readily adjustable (by the driver of the vehicle to adjust the rearward field of view at the mirror reflective element) about the mirror pivot joint at the outer end of the mounting arm opposite the mounting base. The base joint may substantially retain the mounting arm in the preset orientation, and optionally the base joint may be adjustable to change or adjust the preset orientation, such as via a technician or the like that may adjust the orientation when installing a new windshield or servicing or replacing the camera or the like. Such adjustment of the base joint may require a skilled professional and/or may require a tool and, thus, the base joint may not be readily adjusted via the driver of the vehicle, such as when the driver is adjusting the mirror head to adjust the rearward field of view at the reflective element. Any such adjustment of the base joint may require a special tool or the like and/or may require a greater applied torque as compared to the torque applied by a driver of the vehicle to adjust the rearward field of view at the reflective element via pivotal adjustment at the mirror ball joint.

Optionally, the adjustable concept and components of the mounting assembly of the present invention may be utilized with an accessory module or windshield electronics module or the like, and the mirror assembly may mount to the module (such as to a mirror mounting button at the rear surface of the accessory module with the angle of the mounting button being adjusted and selected and set by the adjustable mounting assembly of the accessory module). The accessory module or windshield electronics module may utilize aspects of the modules described in U.S. Pat. Nos. 7,538,316; 7,446,650; 7,188,963; 7,004,593; 6,824,281; 6,774,356; 6,690,268; 6,250,148; 6,341,523; 6,593,565; 6,428,172; 6,501,387; 6,329,925; and 6,326,613, and/or in PCT Application No. PCT/US03/40611, filed Dec. 19, 2003 by Donnelly Corp. et al. for ACCESSORY SYSTEM FOR VEHICLE, and published Jul. 15, 2004 as International Publication No. WO 2004/058540, and/or Ireland pat. applications, Ser. No. S2004/0614, filed Sep. 15, 2004; Ser. No. S2004/0838, filed Dec. 14, 2004; and Ser. No. S2004/0840, filed Dec. 15, 2004, which are all hereby incorporated herein by reference in their entireties.

Optionally, the mirror assembly may comprise an electro-optic or electrochromic mirror assembly and may include an electro-optic or electrochromic reflective element. The electrochromic mirror element of the electrochromic mirror assembly may utilize the principles disclosed in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein in their entireties; and/or as described in U.S. Pat. No. 7,195,381, which is hereby incorporated herein by reference in its entirety. Optionally, the electrochromic circuitry and/or a glare sensor (such as a rearward facing glare sensor that receives light from rearward of the mirror assembly and vehicle through a port or opening along the casing and/or bezel portion and/or reflective element of the mirror assembly) and circuitry and/or an ambient light sensor and circuitry may be provided on one or more circuit boards of the mirror assembly. The mirror assembly may include one or more other displays, such as the types disclosed in U.S. Pat. Nos. 5,530,240 and/or 6,329,925, which are hereby incorporated herein by reference in their entireties, and/or display-on-demand transflective type displays, such as the types disclosed in U.S. Pat. Nos. 7,274,501; 7,255,451; 7,195,381; 7,184,190; 5,668,663; 5,724,187 and/or 6,690,268, and/or in U.S. patent application Ser. No. 11/226,628, filed Sep. 14, 2005; and/or Ser. No. 10/538,724, filed Jun. 13, 2005, and/or PCT Application No. PCT/US03/29776, filed Sep. 9, 2003 by Donnelly Corp. et al. for MIRROR REFLECTIVE ELEMENT ASSEMBLY, and published Apr. 1, 2004 as International Publication No. WO 2004/026633, which are all hereby incorporated herein by reference in their entireties. The thicknesses and materials of the coatings on the substrates, such as on the third surface of the reflective element assembly, may be selected to provide a desired color or tint to the mirror reflective element, such as a blue colored reflector, such as is known in the art and such as described in U.S. Pat. Nos. 5,910,854; 6,420,036; and/or 7,274,501, and in PCT Application No. PCT/US03/29776, filed Sep. 9, 2003 by Donnelly Corp. et al. for MIRROR REFLECTIVE ELEMENT ASSEMBLY, and published Apr. 1, 2004 as International Publication No. WO 2004/026633, which are all hereby incorporated herein by reference in their entireties.

Optionally, the interior rearview mirror assembly may comprise a prismatic mirror assembly or a non-electro-optic mirror assembly or an electro-optic or electrochromic mirror assembly. For example, the interior rearview mirror assembly may comprise a prismatic mirror assembly, such as the types described in U.S. Pat. Nos. 7,249,860; 6,318,870; 6,598,980; 5,327,288; 4,948,242; 4,826,289; 4,436,371; and 4,435,042; and PCT Application No. PCT/US2004/015424, filed May 18, 2004 by Donnelly Corporation et al. for MIRROR ASSEMBLY FOR VEHICLE, and published on Dec. 2, 2004, as International Publication No. WO 2004/103772, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,274,501; 7,249,860; 7,338,177; and/or 7,255,451, and/or PCT Application No. PCT/US03/29776, filed Sep. 19, 2003 by Donnelly Corp. et al. for MIRROR REFLECTIVE ELEMENT ASSEMBLY, and published Apr. 1, 2004 as International Publication No. WO 2004/026633; and/or PCT Application No. PCT/US2004/015424, filed May 18, 2004 by Donnelly Corporation et al. for MIRROR ASSEMBLY FOR VEHICLE, and published on Dec. 2, 2004, as International Publication No. WO 2004/103772; and U.S. provisional application Ser. No. 60/525,952, filed Nov. 26, 2003, which are all hereby incorporated herein by reference in their entireties, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319; and 6,315,421 (the entire disclosures of which are hereby incorporated by reference herein), that can benefit from the present invention.

Optionally, the mirror assembly may include user interface inputs 42 (FIG. 1), such as buttons or switches or touch or proximity sensors or the like, with which a user may adjust one or more characteristics of the imaging sensor and/or imaging system, such as via the principles described in U.S. patent application Ser. No. 12/091,525, filed Apr. 25, 2008, now U.S. Pat. No. 7,855,755;and/or Ser. No. 11/239,980, filed Sep. 30, 2005, now U.S. Pat. No. 7,881,496,and/or U.S. provisional applications, Ser. No. 60/614,644, filed Sep. 30, 2004; Ser. No. 60/618,686, filed Oct. 14, 2004; and Ser. No. 60/628,709, filed Nov., 17, 2004, which are hereby incorporated herein by reference in their entireties. Optionally, the images captured by the imaging sensor or camera may be processed by the control to extract information or data for different applications or systems, such as described in U.S. patent application Ser. No. 11/239,980, filed Sep. 30, 2005, now U.S. Pat. No. 7,881,496, and/or U.S. provisional application Ser. No. 60/618,686, filed Oct. 14, 2004, which are hereby incorporated herein by reference in their entireties.

The interior rearview mirror assembly may include a bezel portion and casing, such as described above, or the mirror assembly may comprise other types of casings or bezel portions or the like, such as described in U.S. Pat. Nos. 7,249,860; 6,439,755; 4,826,289; and 6,501,387; and/or PCT Application No. PCT/US2004/015424, filed May 18, 2004 by Donnelly Corp. et al. for MIRROR ASSEMBLY FOR VEHICLE, and published on Dec. 2, 2004, as International Publication No. WO 2004/103772; and/or U.S. patent applications, and/or Ser. No. 10/993,302, filed Nov. 19, 2004; and/or U.S. provisional application Ser. No. 60/525,952, filed Nov. 26, 2003, which are all hereby incorporated herein by reference in their entireties, without affecting the scope of the present invention. For example, the mirror assembly may comprise a flush or frameless or bezelless reflective element, such as the types described in U.S. Pat. Nos. 7,255,451; 7,274,501; and/or 7,184,190, and/or in PCT Application No. PCT/US2004/015424, filed May 18, 2004 by Donnelly Corp. et al. for MIRROR ASSEMBLY FOR VEHICLE, and published on Dec. 2, 2004, as International Publication No. WO 2004/103772; PCT Application No. PCT/US03/35381, filed Nov. 5, 2003 by Donnelly Corp. et al. for ELECTRO-OPTIC REFLECTIVE ELEMENT ASSEMBLY, and published May 21, 2004 as International Publication No. WO 2004/042457; and/or in U.S. patent application Ser. No. 11/140,396, filed May 27, 2005; Ser. No. 11/226,628, filed Sep. 14, 2005; Ser. No. 11/912,576, filed Oct. 25, 2005, now U.S. Pat. No. 7,626, 749; and/or Ser. No. 10/538,724, filed Jun. 13, 2005 and published Mar. 9, 2006 as U.S. Publication No. 2006/0050018; and/or in U.S. provisional applications, Ser. No. 60/563,342, filed Apr. 19, 2004; Ser. No. 60/629,926, filed Nov. 22, 2004; Ser. No. 60/624,320, filed Nov. 2, 2004; Ser. No. 60/681,250, filed May 16, 2005; Ser. No. 60/690,400, filed Jun. 14, 2005; Ser. No, 60/695,149, filed Jun. 29, 2005; and/or Ser. No. 60/730,334, filed Oct. 26, 2005, which are all hereby incorporated herein by reference in their entireties.

Optionally, the mirror assembly may comprise a modular mirror construction, and may include back housing portions or the like, such as cap portions of the types described in PCT Application No. PCT/US2004/015424, filed May 18, 2004 by Donnelly Corporation et al. for MIRROR ASSEMBLY FOR VEHICLE, and published on Dec. 2, 2004, as International Publication No. WO 2004/103772, which is hereby incorporated herein by reference in its entirety. The display screen may be provided as a modular display screen and may be mountable or installable in the appropriate or suitable mirror casing to provide a modular mirror assembly and display screen. For example, a rear casing or cap portion may include the display screen module including the associated components, such as the rails and motor and the like, and may be attachable to a reflective element and/or bezel portion to assemble the modular mirror assembly. The display screen module thus may be provided as an optional component or accessory for a vehicle, and may be readily assembled to a common reflective element and/or bezel portion of the mirror assembly.

Optionally, the mirror casing and/or reflective element may include customized or personalized viewable characteristics, such as color or symbols or indicia selected by the vehicle manufacturer or owner of the vehicle, such as the customization characteristics described in PCT Application No. PCT/US2004/015424, filed May 18, 2004 by Donnelly Corporation et al. for MIRROR ASSEMBLY FOR VEHICLE, and published on Dec. 2, 2004, as International Publication No. WO 2004/103772; and/or U.S. patent application Ser. No. 11/912,576, filed Oct. 25, 2005, now U.S. Pat. No. 7,626,749; Ser. No. 11/243,783, filed Oct. 5, 2005; and/or Ser. No. 11/021,065, filed Dec. 23, 2004, now U.S. Pat. No. 7,255,451; and/or U.S. provisional applications, Ser. No. 60/553,842, filed Mar., 17, 2004; Ser. No. 60/563,342, filed Apr. 19, 2004; Ser. No. 60/629,926, filed Nov. 22, 2004; Ser. No. 60/681,250, filed May 16, 2005; Ser. No. 60/690,400, filed Jun. 14, 2005; Ser. No. 60/695,149, filed Jun. 29, 2005; Ser. No. 60/730,334, filed Oct. 26, 2005; and/or Ser. No. 60/616,182, filed Oct. 5, 2004, which are hereby incorporated herein by reference in their entireties. For example, the frame or casing of the display module and/or the mirror assembly may be selected to have a desired color or combination of colors (or text or print or indicia thereon) to personalize the appearance of the mirror assembly. Optionally, the reflective element may include text or symbols or icons or other characters or indicia to provide a desired appearance or message at the mirror assembly or display screen, such as by utilizing aspects of the mirror assembly described in PCT Application No. PCT/US2004/015424, filed May 18, 2004 by Donnelly Corporation et al. for MIRROR ASSEMBLY FOR VEHICLE, and published on Dec. 2, 2004, as International Publication No. WO 2004/103772; and/or U.S. patent application Ser. No. 11/912,576, filed Oct. 25, 2005, now U.S. Pat. No. 7,626,749; Ser. No. 11/243,783, filed Oct. 5, 2005, which are hereby incorporated herein by reference in their entireties. The icons or characters or indicia may be formed at or near or on the display screen, or may be provided via graphic overlays when the display screen is extended and operating, or may otherwise be formed or provided at or on or in the display screen casing or frame, without affecting the scope of the present invention. Optionally, the bezel or frame color or colors may be selected to be designer colors or may match or contrast the color of the mirror casing, and/or may have logos or icons or other indicia thereon. Optionally, the display screen module may include warnings or other statements or alerts or messages printed or otherwise formed on the bezel or frame portion of the display screen so that the messages or the like are readily viewable when the display screen is extended.

Optionally, the mirror assembly and/or prismatic or electrochromic reflective element may include one or more displays, such as for the accessories or circuitry described herein. The displays may be of types disclosed in U.S. Pat. Nos. 5,530,240 and/or 6,329,925, which are hereby incorporated herein by reference in their entireties, and/or may be display-on-demand or transflective type displays, such as the types disclosed in U.S. Pat. Nos. 7,195,381; 6,690,298; 5,668,663 and/or 5,724,187, and/or in U.S. patent application Ser. No. 11/226,628, filed Sep. 14, 2005 by Karner et al.; and/or Ser. No. 10/993,302, filed Nov. 19, 2004; and/or in U.S. provisional applications, Ser. No. 60/525,952, filed Nov. 26, 2003; Ser. No. 60/717,093, filed Sep. 14, 2005; and/or Ser. No. 60/732,245, filed Nov. 1, 2005, and/or in PCT Application No. PCT/US03/29776, filed Sep. 19, 2003 by Donnelly Corp. et al. for MIRROR REFLECTIVE ELEMENT ASSEMBLY, and published Apr. 1, 2004 as International Publication No. WO 2004/026633, which are all hereby incorporated herein by reference in their entireties. Optionally, a prismatic reflective element may comprise a display on demand or transflective prismatic element (such as described in PCT Application No. PCT/US03/29776, filed Sep. 19, 2003 by Donnelly Corp. et al. for MIRROR REFLECTIVE ELEMENT ASSEMBLY, and published Apr. 1, 2004 as International Publication No. WO 2004/026633; and/or U.S. patent application Ser. No. 10/993,302, filed Nov. 19, 2004; and/or U.S. provisional application Ser. No. 60/525,952, filed Nov. 26, 2003, which are all hereby incorporated herein by reference in their entireties) so that the displays are viewable through the reflective element, while the display area still functions to substantially reflect light, in order to provide a generally uniform prismatic reflective element even in the areas that have display elements positioned behind the reflective element.

Such a video display screen device or module may comprise any type of video screen and is operable to display images in response to an input or signal from a control or imaging system. For example, the video display screen may comprise a multi-pixel liquid crystal module (LCM) or liquid crystal display (LCD), preferably a thin film transistor (TFT) multi-pixel liquid crystal display (such as discussed below), or the screen may comprise a multi-pixel organic electroluminescent display or a multi-pixel light emitting diode (LED), such as an organic light emitting diode (OLED) or inorganic light emitting diode display or the like, or a passive reflective and/or backlit pixelated display, or an electroluminescent (EL) display, or a vacuum fluorescent (VF) display or the like. For example, the video display screen may comprise a video screen of the types disclosed in U.S. Pat. Nos. 7,370,983; 7,338,177; 7,274,501; 7,255,451; 7,195,381; 7,184,190; 6,902,284; 6,690,268; 6,428,172; 6,420,975; 5,668,663; 5,724,187; 5,416,313; 5,285,060; 5,193,029 and/or 4,793,690, and/or U.S. patent application Ser. No. 10/538,724, filed Jun. 13, 2005 and published Mar. 9, 2006 as U.S. Publication No. 2006/0050018; Ser. No. 11/226,628, filed Sep. 14, 2005 by Karner et al. 2005 and published Mar. 23, 2006 as U.S. Publication No. 2006/0061008; Ser. No. 12/091,525, filed Apr. 25, 2008, now U.S. Pat. No. 7,855,755; Ser. No. 09/585, 379, filed Jun. 1, 2000; Ser. No. 10/207,291, filed Jul. 29, 2002; and/or Ser. No. 10/538,724, filed Jun. 13, 2005, which are hereby incorporated herein by reference in their entireties.

The video display screen may be controlled or operable in response to an input or signal, such as a signal received from one or more cameras or image sensors of the vehicle, such as a video camera or sensor, such as a CMOS imaging array sensor, a CCD sensor or the like, such as the types disclosed in U.S. Pat. Nos. 5,550,677; 5,760,962; 6,396,397; 6,097,023; 5,877,897; and 5,796,094, and/or U.S. patent application Ser. No. 10/534,632, filed May 11, 2005, which are hereby incorporated herein by reference in their entireties, or from one or more imaging systems of the vehicle, such as a reverse or backup aid system, such as a rearwardly directed vehicle vision system utilizing principles disclosed in U.S. Pat. Nos. 5,550,677; 5,760,962; 5,670,935; 6,201,642; 6,396,397; 6,498,620; 6,717,610 and/or 6,757,109, which are hereby incorporated herein by reference in their entireties, a trailer hitching aid or tow check system, such as the type disclosed in U.S. Pat. No. 7,005,974, which is hereby incorporated herein by reference in its entirety, a cabin viewing or monitoring device or system, such as a baby viewing or rear seat viewing camera or device or system or the like, such as disclosed in U.S. Pat. Nos. 5,877,897 and/or 6,690,268, which are hereby incorporated herein by reference in their entireties, a video communication device or system, such as disclosed in U.S. Pat. No. 6,690,268, which is hereby incorporated herein by reference in its entirety, and/or the like. The imaging sensor or camera may be activated and the display screen may be activated in response to the vehicle shifting into reverse, such that the display screen is viewable by the driver and is displaying an image of the rearward scene while the driver is reversing the vehicle.

Optionally, the mirror assembly may include or may be associated with a compass sensor and circuitry for a compass system that detects and displays the vehicle directional heading to a driver of the vehicle. Optionally, an integrated automotive "compass-on-a-chip" may be disposed in a cavity of the mounting base of the mirror (or within the mirror housing or in an attachment to the mirror mount or elsewhere within the mirror assembly such as to the rear of the video screen or to the rear of the mirror reflective element) and may comprise at least two magneto-responsive sensor elements (such as a Hall sensor or multiple Hall sensors), associated A/D and D/A converters, associated microprocessor(s) and memory, associated signal processing and filtering, associated display driver and associated LIN/CAN BUS interface and the like, all (or a sub-set thereof) created or disposed or commonly established onto a semiconductor chip surface/substrate or silicon substrate, such as utilizing CMOS technology and/or fabrication techniques as known in the semiconductor manufacturing arts, and constituting an ASIC chip, such as utilizing principles described in U.S. Pat. Nos. 7,329,013 and/or 7,370,983, and/or U.S. patent application Ser. No. 11/226,628, filed Sep. 14, 2005 and published Mar. 23, 2006 as U.S. Publication No. 2006/0061008; and/or Ser. No. 12/578,732, filed Oct. 14, 2009, which are hereby incorporated herein by reference in their entireties, which are hereby incorporated herein by reference in their entireties, and/or such as by utilizing aspects of an EC driver-on-a-chip such as described in U.S. patent application Ser. No. 11/201,661, filed Aug. 11, 2005 by DeWard et al. for ACCESSORY MODULE FOR VEHICLE, now U.S. Pat. No. 7,480,149, which is hereby incorporated herein by reference in its entirety. The ASIC chip may be small (preferably less than approximately a two square centimeter area, more preferably less than approximately a 1.5 square centimeter area, and most preferably less than approximately a one square centimeter area or thereabouts) and readily packagable into the mirror assembly (or a feed from such a compass-on-a-chip may be provided to the mirror assembly from a compass-on-a-chip packaged elsewhere in the vehicle cabin remote from the mirror assembly such as in an instrument panel portion or in roof console portion). Such large scale integration onto the likes of the silicon substrate/chip can allow a compass functionality to be provided by a relatively small chip, and with appropriate pin out or electrical leads provided as is common in the electrical art.

Optionally, a compass chip or compass module may be disposed at an upper end of the mounting base of a mirror assembly, such as at an upper or connecting end of a wire management element connected to or extending from the mounting base of the mirror assembly, such as by utilizing aspects of the mirror systems described in U.S. patent application Ser. No. 12/578,732, filed Oct. 14, 2009, which is hereby incorporated herein by reference in its entirety. The wire management system may include a wire management element or channel or cover element, such as by utilizing aspects of the wire management systems or elements described in U.S. patent application Ser. No. 11/226,628, filed Sep. 14, 2005 and published Mar. 23, 2006 as U.S. Publication No. 2006/0061008; and/or Ser. No. 11/584,697, filed Oct. 20, 2006, now U.S. Pat. No. 7,510,287, which are hereby incorporated herein by reference in their entireties.

The compass chip may be in communication with a compass display, which may provide a display region at the reflective element, and which includes ports or portions, which may comprise icons, characters or letters or the like representative of only the cardinal directional points, such as, for example, the characters N, S, E, W, formed or etched in the reflective film coating of the reflective element (and forming a transparent window therein), such as via techniques such as disclosed in commonly assigned U.S. Pat. Nos. 4,882,565 and/or 7,004,593, which are hereby incorporated by reference herein in their entireties. Optionally, however, reflective element may comprise a transflective or display on demand (DOD) reflective element, and the compass display may be a display on demand (DOD) type of display, such as disclosed in commonly assigned U.S. Pat. Nos. 7,195,381; 6,690,268; 5,668,663 and 5,724,187, which are hereby incorporated by reference herein in their entireties, without affecting the scope of the present invention.

Optionally, the compass system and compass circuitry may utilize aspects of the compass systems described in U.S. Pat. Nos. 7,370,983; 7,249,860; 7,004,593; 6,928,366; 6,642,851; 6,140,933; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; and/or 6,513,252, and/or PCT Application No. PCT/US2004/015424, filed May 18, 2004 by Donnelly Corp. et al. for MIRROR ASSEMBLY FOR VEHICLE, and published on Dec. 2, 2004, as International Publication No. WO 2004/103772, and/or European patent application, published Oct. 11, 2000 under Publication No. EP 0 1043566, and/or U.S. provisional applications, Ser. No. 60/624,091, filed Nov. 1, 2004; Ser. No. 60/636,931, filed Dec. 17, 2004; Ser. No. 60/638,250, filed Dec. 21, 2004; Ser. No. 60/642,227, filed Jan. 7, 2005; and Ser. No. 60/653,787, filed Feb. 17, 2005, which are all hereby incorporated herein by reference in their entireties. The compass circuitry may include compass sensors, such as a magneto-responsive sensor, such as a magneto-resistive sensor, a magneto-capacitive sensor, a Hall sensor, a magneto-inductive sensor, a flux-gate sensor or the like. The sensor or sensors may be positioned at and within a base portion or mounting base of the mirror assembly so that the sensor/sensors is/are substantially fixedly positioned or retained in a selected position or orientation within the vehicle, or may be attached or positioned within the mirror casing. Note that the magneto-responsive sensor used with the mirror assembly may comprise a magneto-responsive sensor, such as a magneto-resistive sensor, such as the types disclosed in U.S. Pat. Nos. 5,255,442; 5,632,092; 5,802,727; 6,173,501; 6,427,349; and 6,513,252 (which are hereby incorporated herein by reference in their entireties), or a magneto-inductive sensor, such as described in U.S. Pat. No. 5,878,370 (which is hereby incorporated herein by reference in its entirety), or a magneto-impedance sensor, such as the types described in PCT Publication No. WO 2004/076971 A2, published Sep. 10, 2004 (which is hereby incorporated herein by reference in its entirety), or a Hall-effect sensor, such as the types described in U.S. Pat. Nos. 6,278,271; 5,942,895 and 6,184,679 (which are hereby incorporated herein by reference in their entireties). The sensor circuitry and/or the circuitry in the mirror housing and associated with the sensor may include processing circuitry. For example, a printed circuit board may include processing circuitry which may include compensation methods, such as those described in U.S. Pat. Nos. 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; and 6,642,851, which are all hereby incorporated herein by reference in their entireties. The compass sensor may be incorporated in or associated with a compass system and/or display system for displaying a directional heading of the vehicle to the driver, such as a compass system of the types described in U.S. Pat. Nos. 5,924,212; 4,862,594; 4,937,945; 5,131,154; 5,255,442; 5,632,092; and/or 7,004,593, and/or PCT Application No. PCT/US2004/015424, filed May 18, 2004 by Donnelly Corp. et al. for MIRROR ASSEMBLY FOR VEHICLE, and published on Dec. 2, 2004, as International Publication No. WO 2004/103772, which are all hereby incorporated herein by reference in their entireties.

Optionally, the mirror assembly and/or any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle (which may be incorporated at or associated with the mounting assembly and/or mirror assembly), such as an accessory module or console of the types described in U.S. Pat. Nos. 6,877,888; 6,824,281; 6,690,268; 6,672,744; 6,386,742; and 6,124,886, and/or, and/or PCT Application No. PCT/US03/03012, filed Jan. 31, 2003 by Donnelly Corporation for VEHICLE ACCESSORY MODULE, and published Aug. 7, 2003 as International Publication No. WO 03/065084, and/or PCT Application No. PCT/US03/40611, filed Dec. 19, 2003 by Donnelly Corporation for ACCESSORY SYSTEM FOR VEHICLE, and published Jul. 15, 2004 as International Publication No. WO 2004/058540, and/or PCT Application No. PCT/US04/15424, filed May 18, 2004 by Donnelly Corporation et al. for MIRROR ASSEMBLY FOR VEHICLE, and published on Dec. 2, 2004, as International Publication No. WO 2004/103772, which are hereby incorporated herein by reference in their entireties.

Optionally, the user inputs of the mirror assembly may comprise other types of buttons or switches for controlling or activating/deactivating one or more electrical accessories or devices of or associated with the mirror assembly. The mirror assembly may comprise any type of switches or buttons, such as touch or proximity sensing switches, such as touch or proximity switches of the types described above, or the inputs may comprise other types of buttons or switches, such as those described in U.S. Pat. No. 7,360,932 and/or U.S. patent application Ser. No. 11/029,695, filed Jan. 5, 2005, now U.S. Pat. No. 7,253,723; and/or Ser. No. 12/576,550, filed Oct. 9, 2009; and/or U.S. provisional applications, Ser. No. 60/553,517, filed Mar. 16, 2004; Ser. No. 60/535,559, filed Jan. 9, 2004; Ser. No. 60/690,401, filed Jun. 14, 2005; and Ser. No. 60/719,482, filed Sep. 22, 2005, which are hereby incorporated herein by reference in their entireties, or such as fabric-made position detectors, such as those described in U.S. Pat. Nos. 6,504,531; 6,501,465; 6,492,980; 6,452,479; 6,437,258; and 6,369,804, which are hereby incorporated herein by reference in their entireties. For example, the inputs may comprise a touch or proximity sensor of the types commercially available from TouchSensor Technologies, LLC of Wheaton, Ill. The touch or proximity sensor may be operable to generate an electric field and to detect the presence of a conductive mass entering the field. When a voltage is applied to the sensor, the sensor generates the electric field, which emanates through any dielectric material, such as plastic or the like, at the sensor. When a conductive mass (such as a person's finger or the like, or metal or the like) enters the electric field, the sensor may detect a change in the field and may indicate such a detection. Other types of switches or buttons or inputs or sensors may be incorporated to provide the desired function, without affecting the scope of the present invention.

Optionally, the user inputs or buttons may comprise user inputs for a garage door opening system, such as a vehicle based garage door opening system of the types described in U.S. Pat. Nos. 6,396,408; 6,362,771; 7,023,322; and 5,798,688, and/or U.S. provisional applications, Ser. No. 60/502,806, filed Sep. 12, 2003; and Ser. No. 60/444,726, filed Feb. 4, 2003, which are hereby incorporated herein by reference in their entireties. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,377; and 6,420,975; 6,477,464; 6,946,978; 7,308,341; 7,167,796; 7,004,593; and/or 6,678,614, and/or PCT Application No. PCT/US03/40611, filed Dec., 19, 2003 by Donnelly Corporation et al. for ACCESSORY SYSTEM FOR VEHICLE, and published Jul. 15, 2004 as International Publication No. WO 2004/058540, and/or PCT Application No. PCT/US03/308877, filed Oct. 1, 2003 by Donnelly Corp. for MICROPHONE SYSTEM FOR VEHICLE, and published Apr. 15, 2004 as International Publication No. WO 2004/032568, which are all hereby incorporated herein by reference in their entireties.

Optionally, the mirror assembly may include one or more other accessories at or within the mirror casing, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, such as a garage door opener or the like, a digital network, such as described in U.S. Pat. No.

5,798,575, a high/low headlamp controller, such as disclosed in U.S. Pat. Nos. 5,796,094 and/or 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775; and/or 7,249,860, microphones, such as disclosed in U.S. Pat. Nos. 6,243,003; 6,278,377; and/or 6,420,975; and/or U.S. patent application Ser. No. 10/529,715, filed Mar. 30, 2005; and/or PCT Application No. PCT/US03/30877, filed Oct. 1, 2003, and published Apr. 15, 2004 as International Publication No. WO 2004/032568, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 5,929,786 and/or 5,786,772, and/or U.S. patent application Ser. No. 10/427,051, filed Apr. 30, 2003, now U.S. Pat. No. 7,038,577; and Ser. No. 10/209,173, filed Jul. 31, 2002, now U.S. Pat. No. 6,882,287; and/or U.S. provisional application Ser. No. 60/638,687, filed Dec. 23, 2004, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 6,690,268 and 6,847,487; and/or U.S. provisional applications, Ser. No. 60/614,644, filed Sep. 30, 2004; Ser. No. 60/618,686, filed Oct. 14, 2004; Ser. No. 60/628,709, filed Nov. 17, 2004; Ser. No. 60/644,903, filed Jan. 11, 2005; Ser. No. 60/667,049, filed Mar. 31, 2005; and/or U.S. patent application Ser. No. 11/105,757, filed Apr. 14, 2005, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or fraction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205; and/or 7,423,522, and/or U.S. provisional application Ser. No. 60/611,796, filed Sep. 21, 2004), and/or an ONSTAR® system, a compass, such as disclosed in U.S. Pat. Nos. 5,924,212; 4,862,594; 4,937,945; 5,131,154; 5,255,442; and/or 5,632,092, and/or any other accessory or circuitry or the like (with all of the above-referenced patents and PCT and U.S. patent applications being commonly assigned to Donnelly Corporation, and with the disclosures of the referenced patents and patent applications being hereby incorporated herein by reference in their entireties).

Optionally, the mirror assembly (such as at the mounting base, which may be fixed relative to the vehicle windshield) may include an imaging sensor (such as a forward facing imaging sensor or camera that has a forward field of view through the vehicle windshield) that may be part of or may provide an image output for a vehicle vision system, such as a headlamp control system or lane departure warning system or object detection system or other vehicle vision system or the like, and may utilize aspects of various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,038,577; and 7,004,606; and/or U.S. patent application Ser. No. 11/315,675, filed Dec. 22, 2005 and published Aug. 17, 2006 as U.S. Patent Publication No. US-2006-0184297A1; Ser. No. 10/534,632, filed May 11, 2005 and published Aug. 3, 2006 as U.S. Patent Publication No. US-2006-0171704-A1; Ser. No. 12/091,359, filed Jun. 10, 2008; and/or Ser. No. 12/377,054, filed Feb. 10, 2009; and/or PCT Application No. PCT/US2006/041709 filed Oct. 27, 2006, published May 10, 2007 as PCT Publication No. WO 07/053,404; and/or PCT Application No. PCT/US2007/75702, filed Aug. 10, 2007, published Feb. 28, 2008 as PCT Publication No. WO 08/024,639, which are all hereby incorporated herein by reference in their entireties. The sensor may include a lens element or optic between the imaging plane of the imaging sensor and the forward scene to substantially focus the scene at an image plane of the imaging sensor. The imaging sensor may comprise an image sensing module or the like, and may utilize aspects described in U.S. patent application Ser. No. 10/534,632, filed May 11, 2005; and/or PCT Application No. PCT/US2006/041709, filed Oct. 27, 2006 and published May 10, 2007 as International Publication No. WO 07/053,404; and/or PCT Application No. PCT/US2003/036177 filed Nov. 14, 2003 and published Jun. 3, 2004 as PCT Publication No. WO 2004/047421, which are hereby incorporated herein by reference in their entireties.

Optionally, the accessory or accessories, such as those described above and/or below, may be positioned at or within the mirror casing and may be included on or integrated in a printed circuit board positioned within the mirror casing, such as along a rear surface of the reflective element or elsewhere within a cavity defined by the casing, without affecting the scope of the present invention. The user actuatable inputs and/or touch sensors and/or proximity sensors and displays described above may be actuatable to control and/or adjust the accessories of the mirror assembly/system and/or overhead console and/or accessory module and/or vehicle. The connection or link between the controls and the display screen device and/or the navigation system and/or other systems and accessories of the mirror system may be provided via vehicle electronic or communication systems and the like, and may be connected via various protocols or nodes, such as BLUETOOTH®, SCP, UBP, J1850, CAN J2284, Fire Wire 1394, MOST, LIN, FlexRay™, Byte Flight and/or the like, or other vehicle-based or in-vehicle communication links or systems (such as WIFI and/or IRDA) and/or the like, or via VHF or UHF or other wireless transmission formats, depending on the particular application of the mirror/accessory system and the vehicle. Optionally, the connections or links may be provided via various wireless connectivity or links, without affecting the scope of the present invention.

Changes and modifications in the specifically described embodiments may be carried out without departing from the principles of the present invention, which is intended to be limited only by the scope of the appended claims as interpreted according to the principles of patent law.

The invention claimed is:

1. An interior rearview mirror assembly for a vehicle, said interior rearview mirror assembly comprising:
a mirror casing and a reflective element;
a mounting assembly for adjustably mounting said mirror casing at an interior portion of a vehicle that is equipped with said mirror assembly;
wherein said mounting assembly comprises a mounting base that is attachable to an interior portion of the equipped vehicle and a mounting arm adjustably mounted to said mounting base via a base joint, and wherein said mirror casing is pivotally adjustable relative to said mounting arm via a mirror pivot joint;
wherein said base joint allows for at least one of (a) adjustment of said mounting arm in a generally vertical plane when said mirror assembly is normally mounted in the equipped vehicle and (b) adjustment of said mounting arm about a generally horizontal pivot axis when said mirror assembly is normally mounted in the equipped vehicle;
wherein said base joint substantially limits adjustment of said mounting arm in non-generally vertical planes and about non-generally horizontal pivot axes;
wherein said mirror pivot joint allows for pivotal adjustment of a rearward field of view of said reflective element by a driver of the equipped vehicle when the mirror assembly is normally mounted in the equipped vehicle; and
wherein said mounting base of said mounting assembly supports a forward facing camera that has a forward field of view through a windshield of the equipped vehicle when said mounting assembly is attached to an interior portion of the windshield of the equipped vehicle, and wherein said forward facing camera is disposed at least partially in said mounting base and is adjusted in tandem with said mounting arm when said mounting arm is adjusted relative to said mounting base.

2. The interior rearview mirror assembly of claim 1, wherein said mounting base comprises a clamping element that limits pivotal movement of said mounting arm about a generally horizontal pivot axis when said mounting arm is positioned at a selected orientation relative to said mounting base.

3. The interior rearview mirror assembly of claim 1, wherein said mounting arm comprises an arm portion and a cylindrical portion at a base end of said arm portion, and wherein said cylindrical portion engages a portion of said mounting base to allow pivotal adjustment of said mounting arm about a generally horizontal pivot axis while limiting pivotal adjustment of said mounting arm about non-generally horizontal axes.

4. The interior rearview mirror assembly of claim 3, wherein said mounting base comprises a clamping element that urges said cylindrical portion of said mounting arm towards said portion of said mounting base to limit pivotal movement of said mounting arm about said generally horizontal pivot axis.

5. The interior rearview mirror assembly of claim 4, wherein said cylindrical portion comprises at least one retaining element and said portion of said mounting arm comprises at least one retaining element, and wherein said retaining elements engage one another and retain said mounting arm in a selected orientation relative to said mounting base.

6. The interior rearview mirror assembly of claim 1, wherein said mirror pivot joint comprises a ball and socket joint and allows for pivotal adjustment of said mirror casing relative to the mounting arm in both vertical and horizontal directions to adjust the rearward field of view of the reflective element when said mirror assembly is normally mounted in the equipped vehicle.

7. The interior rearview mirror assembly of claim 1, wherein a base end of said mounting arm is disposed at at least one arcuate arm of said mounting base and is adjustable relative to said arm to adjust said mounting arm in generally a vertical plane and about a generally horizontal pivot axis when said mirror assembly is normally mounted in the equipped vehicle.

8. The interior rearview mirror assembly of claim 1, wherein said mounting assembly supports an accessory and wherein said accessory is adjusted to a selected orientation when said mounting arm is adjusted via said base joint to a selected orientation relative to the windshield of the equipped vehicle when said mounting assembly is attached to an interior portion of the windshield of the equipped vehicle.

9. The interior rearview mirror assembly of claim 1, wherein said base portion includes a shield element and wherein said forward facing camera is disposed at said shield element and with said forward field of view through said shield element, and wherein said forward field of view of said camera is adjustable relative to the windshield when said interior rearview mirror assembly is normally mounted in the equipped vehicle.

10. The interior rearview mirror assembly of claim 9, wherein said forward facing camera and said shield element are adjusted in tandem with said mounting arm so that said mounting arm and said camera are adapted for the particular angle of the windshield to which said mirror assembly is mounted.

11. The interior rearview mirror assembly of claim 10, wherein said mounting assembly is adjusted to set said camera relative to the windshield such that said forward facing camera has one of (a) a generally horizontal forward field of view through the windshield when said mirror assembly is normally mounted at the equipped vehicle or (b) a slightly downwardly angled or upwardly angled field of view through the windshield when said mirror assembly is normally mounted at the equipped vehicle.

12. An interior rearview mirror assembly for a vehicle, said interior rearview mirror assembly comprising:
a mirror casing and a reflective element, wherein said reflective element comprises one of a prismatic reflective element and an electrochromic reflective element;
a mounting assembly for adjustably mounting said mirror casing at an interior portion of a vehicle that is equipped with said mirror assembly;
wherein said mounting assembly comprises a mounting base that is attachable to an interior portion of the equipped vehicle and a mounting arm adjustably mounted to said mounting base via a base joint, and wherein said mirror casing is pivotally adjustable relative to said mounting arm via a mirror pivot joint;
wherein said base joint allows for at least one of (a) adjustment of said mounting arm in a generally vertical plane when said mirror assembly is normally mounted in the equipped vehicle and (b) adjustment of said mounting arm about a generally horizontal pivot axis when said mirror assembly is normally mounted in the equipped vehicle;
wherein said base joint substantially limits adjustment of said mounting arm in non-generally vertical planes and about non-generally horizontal pivot axes;

wherein said mirror pivot joint allows for pivotal adjustment of a rearward field of view of said reflective element by a driver of the equipped vehicle when the mirror assembly is normally mounted in the equipped vehicle; and wherein said mounting base of said mounting assembly accommodates a forward facing camera that has a forward field of view through a windshield of the equipped vehicle when said mounting assembly is attached to an interior portion of the windshield of the equipped vehicle, and wherein said forward facing camera is disposed at least partially in said mounting base and is adjusted in tandem with said mounting arm when said mounting arm is adjusted relative to said mounting base.

13. The interior rearview mirror assembly of claim 12, wherein said mounting base comprises a clamping element that limits pivotal movement of said mounting arm about a generally horizontal pivot axis when said mounting arm is positioned at a selected orientation relative to said mounting base.

14. The interior rearview mirror assembly of claim 12, wherein said mounting arm comprises an arm portion and a cylindrical portion at a base end of said arm portion, and wherein said cylindrical portion engages a portion of said mounting base to allow pivotal adjustment of said mounting arm about a generally horizontal pivot axis while limiting pivotal adjustment of said mounting arm about non-generally horizontal axes, and wherein said mounting base comprises a clamping element that urges said cylindrical portion of said mounting arm towards said portion of said mounting base to limit pivotal movement of said mounting arm about said generally horizontal pivot axis, and wherein said cylindrical portion comprises at least one retaining element and said portion of said mounting arm comprises at least one retaining element, and wherein said retaining elements engage one another and retain said mounting arm in a selected orientation relative to said mounting base.

15. The interior rearview mirror assembly of claim 12, wherein a base end of said mounting arm is disposed at at least one arcuate arm of said mounting base and is adjustable relative to said arm to adjust said mounting arm in generally a vertical plane and about a generally horizontal pivot axis when said mirror assembly is normally mounted in the equipped vehicle.

16. An interior rearview mirror assembly for a vehicle, said interior rearview mirror assembly comprising:
   a mirror casing and a reflective element;
   a mounting assembly for adjustably mounting said mirror casing at an interior portion of a vehicle that is equipped with said mirror assembly;

wherein said mounting assembly comprises a mounting base that is attachable to an interior portion of the equipped vehicle and a mounting arm adjustably mounted to said mounting base via a base joint, and wherein said mirror casing is pivotally adjustable relative to said mounting arm via a mirror pivot joint;

wherein said base joint allows for at least one of (a) adjustment of said mounting arm in a generally vertical plane when said mirror assembly is normally mounted in the equipped vehicle and (b) adjustment of said mounting arm about a generally horizontal pivot axis when said mirror assembly is normally mounted in the equipped vehicle;

wherein said base joint substantially limits adjustment of said mounting arm in non-generally vertical planes and about non-generally horizontal pivot axes;

wherein said mirror pivot joint allows for pivotal adjustment of a rearward field of view of said reflective element by a driver of the equipped vehicle when the mirror assembly is normally mounted in the equipped vehicle; and wherein said base portion of said mounting assembly accommodates a forward facing camera that has a forward field of view through a windshield of the equipped vehicle when said mounting assembly is attached to an interior portion of the windshield of the equipped vehicle, and wherein said forward facing camera is disposed at a shield element with said forward field of view through said shield element, and wherein said forward facing camera and said shield element are disposed at least partially in said mounting base and are adjusted in tandem with said mounting arm so that said mounting arm and said camera are adapted for the particular angle of the windshield to which said mirror assembly is mounted.

17. The interior rearview mirror assembly of claim 16, wherein said forward field of view of said camera is adjustable relative to the windshield when said interior rearview mirror assembly is normally mounted in the equipped vehicle.

18. The interior rearview mirror assembly of claim 16, wherein said mounting assembly is adjusted to set said camera relative to the windshield such that said forward facing camera has one of (a) a generally horizontal forward field of view through the windshield when said mirror assembly is normally mounted at the equipped vehicle or (b) a slightly downwardly angled or upwardly angled field of view through the windshield when said mirror assembly is normally mounted at the equipped vehicle.

* * * * *

UNITED STATES PATENT AND TRADEMARK OFFICE
CERTIFICATE OF CORRECTION

PATENT NO. : 8,451,332 B2  Page 1 of 1
APPLICATION NO. : 13/258850
DATED : May 28, 2013
INVENTOR(S) : Donald S. Rawlings It is certified that error appears in the above-identified patent and that said Letters Patent is hereby corrected as shown below:

In the Specifications

Column 1
Line 9, Delete "," after "Mar."

Column 7
Line 22, "20e" should be --20c--
Line 37, "32e" should be --32c--

Column 10
Line 47, Delete "," after "when"

Column 18
Line 26, "aim" should be --arm--

Column 21
Line 6, "No," should be --No.--
Line 42, Delete "," after "Mar."

Column 26
Line 49, Delete "," after "Dec."

Column 27
Line 49, "fraction" should be --traction--

Signed and Sealed this
Twenty-fourth Day of December, 2013

Margaret A. Focarino
*Commissioner for Patents of the United States Patent and Trademark Office*